(12) United States Patent
Muragishi et al.

(10) Patent No.: US 8,626,386 B2
(45) Date of Patent: Jan. 7, 2014

(54) DAMPING APPARATUS FOR REDUCING VIBRATION OF AUTOMOBILE BODY

(75) Inventors: Yasushi Muragishi, Ise (JP); Hideaki Moriya, Ise (JP); Yushi Sato, Ise (JP); Takashi Fukunaga, Ise (JP); Katsuyoshi Nakano, Ise (JP); Hiroshi Nakagawa, Ise (JP); Takayoshi Fujii, Ise (JP); Takashi Onoue, Ise (JP); Masaaki Narihisa, Ise (JP)

(73) Assignee: Shinko Electric Co., Ltd. (JP)

( * ) Notice: Subject to any disclaimer, the term of this patent is extended or adjusted under 35 U.S.C. 154(b) by 56 days.

(21) Appl. No.: 13/443,389

(22) Filed: Apr. 10, 2012

(65) Prior Publication Data

US 2012/0193847 A1 Aug. 2, 2012

Related U.S. Application Data

(62) Division of application No. 12/300,006, filed as application No. PCT/JP2007/059250 on Apr. 27, 2007, now Pat. No. 8,401,735.

(30) Foreign Application Priority Data

| May 8, 2006 | (JP) | 2006-129013 |
| Jan. 15, 2007 | (JP) | 2007-006006 |
| Mar. 5, 2007 | (JP) | 2007-054274 |
| Mar. 5, 2007 | (JP) | 2007-054532 |
| Mar. 6, 2007 | (JP) | 2007-055423 |
| Apr. 13, 2007 | (JP) | 2007-105728 |

(51) Int. Cl.
*G06F 7/00* (2006.01)

(52) U.S. Cl.
USPC ........... 701/36; 701/37; 267/140.15; 188/378

(58) Field of Classification Search
USPC ............ 701/36, 37; 267/136, 140.11, 140.14, 267/140.15; 188/378–380
See application file for complete search history.

(56) References Cited

U.S. PATENT DOCUMENTS

| 4,929,874 A | 5/1990 | Mizuno et al. |
| 5,233,797 A | 8/1993 | Uno et al. |

(Continued)

FOREIGN PATENT DOCUMENTS

| EP | 0412853 A2 | 2/1991 |
| EP | 0587202 A2 | 1/1994 |

(Continued)

OTHER PUBLICATIONS

"Application techniques of adaptive filters", Toshifumi Kosaka, The Journal of the Acoustical Society of Japan, vol. 48, No. 7, p. 520.

(Continued)

*Primary Examiner* — Pamela Rodriguez
(74) *Attorney, Agent, or Firm* — Cantor Colburn LLP

(57) ABSTRACT

A damping apparatus for an automobile is provided, capable of ensuring a high level of reliability while obtaining excellent damping effect with simple configuration. The damping apparatus for an automobile that reduces vibrations of an automobile body may include an actuator that is attached to the automobile body and drives an auxiliary mass; a current detector that detects a current flowing through an armature of the actuator; a section that detects a terminal voltage applied to the actuator; a calculation circuit that calculates an induced voltage of the actuator, and further calculates at least one of the relative velocity, relative displacement, and relative acceleration of the actuator, based on a current detected by the current detector and the terminal voltage; and a control circuit that drive-controls the actuator based on at least one of the relative velocity, relative displacement, and relative acceleration of the actuator calculated by the calculation circuit.

17 Claims, 23 Drawing Sheets

(56) References Cited

U.S. PATENT DOCUMENTS

| | | | |
|---|---|---|---|
| 5,410,845 A | 5/1995 | Sakamoto et al. | |
| 5,439,204 A | 8/1995 | Yamazoe et al. | |
| 5,456,341 A | 10/1995 | Garnjost et al. | |
| 5,520,375 A | 5/1996 | Leibach et al. | |
| 5,620,068 A * | 4/1997 | Garnjost et al. | 188/378 |
| 5,777,232 A | 7/1998 | Kurita et al. | |
| 5,920,173 A | 7/1999 | Mercadal et al. | |
| 6,006,875 A | 12/1999 | van Namen | |
| 6,009,985 A | 1/2000 | Ivers | |
| 6,279,704 B1 | 8/2001 | Manfredotti | |
| 6,427,815 B1 | 8/2002 | Zeller | |
| 6,675,955 B2 | 1/2004 | Nasser-Moghaddassi et al. | |
| 6,960,893 B2 | 11/2005 | Yoshida et al. | |
| 7,637,359 B2 | 12/2009 | Melz et al. | |
| 7,974,769 B2 | 7/2011 | Shin | |
| 2002/0043879 A1 | 4/2002 | Joong et al. | |
| 2005/0120444 A1 | 6/2005 | Takenaka | |
| 2005/0228513 A1 | 10/2005 | Nihei et al. | |
| 2005/0228574 A1 | 10/2005 | Ichikawa et al. | |
| 2005/0248070 A1 | 11/2005 | Ichikawa et al. | |
| 2006/0023388 A1 | 2/2006 | Ichikawa et al. | |
| 2006/0054738 A1 | 3/2006 | Badre-Alam et al. | |
| 2006/0287788 A1 | 12/2006 | Ichikawa et al. | |

FOREIGN PATENT DOCUMENTS

| | | | |
|---|---|---|---|
| EP | 0821180 A2 | 1/1998 | |
| EP | 1566564 B1 | 8/2005 | |
| GB | 2406369 A | 3/2005 | |
| JP | 60-187253 A | 9/1985 | |
| JP | 61-220925 A | 10/1986 | |
| JP | 61-220926 A | 10/1986 | |
| JP | 64-83742 A | 3/1989 | |
| JP | 11-31014 A | 5/1989 | |
| JP | 11-94018 A | 8/1989 | |
| JP | 03024340 A | 2/1991 | |
| JP | 3-82385 A | 4/1991 | |
| JP | 3-219140 A | 9/1991 | |
| JP | 3-292219 A | 12/1991 | |
| JP | 5-231035 A | 9/1993 | |
| JP | 5-286334 A | 11/1993 | |
| JP | 6-58014 A | 3/1994 | |
| JP | 6-83368 A | 3/1994 | |
| JP | 6-95744 A | 4/1994 | |
| JP | 6-117483 A | 4/1994 | |
| JP | 7-42783 A | 2/1995 | |
| JP | 7-261852 A | 10/1995 | |
| JP | 7-311124 A | 11/1995 | |
| JP | 9-218687 A | 8/1997 | |
| JP | 10-32891 A | 2/1998 | |
| JP | 10-49204 A | 2/1998 | |
| JP | 11-259147 A | 9/1999 | |
| JP | 2000-3181 A | 1/2000 | |
| JP | 2000-3204 A | 1/2000 | |
| JP | 2001-51703 A | 2/2001 | |
| JP | 2001-182775 A | 7/2001 | |
| JP | 2002-125360 A | 4/2002 | |
| JP | 2003-148108 A | 5/2003 | |
| JP | 2003-195950 A | 7/2003 | |
| JP | 2004-343964 A | 12/2004 | |
| JP | 2005-180332 A | 7/2005 | |
| JP | 2005-299829 A | 10/2005 | |
| JP | 2005-299832 A | 10/2005 | |
| JP | 2005-301508 A | 10/2005 | |
| JP | 2006-38188 A | 2/2006 | |
| JP | 2007024102 A | 2/2007 | |
| WO | 03/058355 A1 | 7/2003 | |

OTHER PUBLICATIONS

European Search Report for Application No. 07742685.6-2424 / 2023007 PCT/JP2007059250 mailed May 26, 2009 (with English Translation).

Extended European Search Report for Application No./Patent No. 08075933.5-2424/2072852 dated Aug. 20, 2010.

Extended European Search Report for Application No./Patent No. 08075935.0-2424/2080928 dated Aug. 30, 2010.

International Search Report for International Application No. PCT/JP2007/059250 mailed Aug. 14, 2007 with English Translation.

Japanese Office Action, Notification of Reasons for Refusal for Japanese patent application No. 2012-153440 drafting date of Apr. 18, 2013, with English Translation.

* cited by examiner

DAMPING APPARATUS FOR REDUCING VIBRATION OF AUTOMOBILE BODY

CROSS REFERENCE TO RELATED APPLICATION

The present application is a divisional application of U.S. patent application Ser. No. 12/300,006, filed on Nov. 17, 2008, the entire contents of which are incorporated herein by reference and priority to which is hereby claimed. The Ser. No. 12/300,006 is a U.S. national stage of application No. CT/JP2007/059250, filed Apr. 27, 2007, the entire contents of which are incorporated herein by reference and priority to which is hereby claimed. Priority under 35 U.S.C. §119(a) and 35 U.S.C. §365(b) is claimed from Japanese Patent Application No. 2006-129013, filed May 8, 2006; Japanese Patent Application No. 2007-006006, filed Jan. 15, 2007; Japanese Patent Application No. 2007-054532, filed Mar. 5, 2007; Japanese Patent Application No. 2007-054274, filed Mar. 5, 2007; Japanese Patent Application No. 2007-055423, filed Mar. 6, 2007; and Japanese Patent Application No. 2007-105728, filed Apr. 13, 2007, the disclosures of each of which are incorporated herein by reference.

TECHNICAL FIELD

The present invention relates to a damping apparatus and a damping control method for an automobile for performing automobile vibration suppression control.

BACKGROUND ART

In order to improve riding feel and comfort of an automobile, there is a need for a contrivance so that engine vibrations are not transmitted to the driver compartment. Heretofore, there has been proposed a technique for reducing automobile body vibration by imparting a vibration absorbing function to the mounting mechanism that supports an engine, or by forced excitation with use of an actuator (for example, refer to Japanese Unexamined Patent Application, First Publication No. S61-220925, and Japanese Unexamined Patent Application, First Publication No. S64-083742).

In conventional techniques, in order to control an actuator, sensors are used for detecting relative displacement, relative velocity, and relative acceleration between the actuator movable section and the fixation section. However, the sensors need to be installed in the vicinity of the engine where they are exposed to a high temperature environment, and consequently there is a problem of a lack of reliability.

Moreover, in the case of using plate springs or the like in order to ensure durability of a movable element supporting means of the actuator, a resonance system is constituted by a movable section mass and plate spring constant. However, in controlling automobile vibration, there is a problem of negative impact on vibration suppression control in that in the case where the resonance magnification is high, if the resonance frequency changes even slightly due to temperature changes or age related changes, the response of the actuator to command signals changes significantly.

Also, there is known a vibration suppression apparatus that can actively reduce vibrations of the vibration prevention target object over an entire wide frequency bandwidth by; detecting vibrations of the vibration prevention target object, passing this detection signal through a filter to thereby generate vibration waveforms that interfere with the vibrations of the vibration prevention target object and cancel out the vibrations, and applying signals based on these vibration waveforms to the actuator (for example, refer to Japanese Unexamined Patent Application, First Publication No. H03-219140).

Control is performed to automobiles of recent years that aims to improve fuel economy by stopping cylinders of a six cylinder engine as required so as to drive the engine with fewer cylinders (for example, with three cylinders). If the cylinders are stopped, there is a possibility that engine vibrations may increase compared to the vibrations in a six cylinder operation. For solving such problems, as disclosed in Japanese Unexamined Patent Application, First Publication No. H03-219140, a vibration suppression apparatus that actively reduces vibrations across a wide frequency bandwidth is effective.

However, the conventional damping apparatus performs only a control to suppress vibrations being generated. Therefore, there is a problem in that in an automobile to which control is performed to stop a predetermined number of cylinders in a six cylinder engine, all vibrations are suppressed so that it is difficult to sense that the engine is driving, and hence the driver experiences discomfort. It is desirable the driver experiences no discomfort, by suppressing the vibrations without letting the driver feel the switch from six cylinder driving to a cylinder stop operation.

There is also known a vibration control apparatus for an automobile that uses an actuator that uses reaction force occurring as a result of driving a movable section, to thereby generate a damping force according to engine revolution speed (for example, refer to Japanese Unexamined Patent Application, First Publication No. S61-220925). According to this apparatus, vibrations of the automobile body can be predicted from the revolution speed of the automobile engine, and a force applied to the automobile body from the engine can be canceled by the actuator. Therefore, it is possible to reduce vibrations of the automobile body. Such a damping apparatus uses a linear actuator that performs reciprocation, to vibrate an auxiliary mass to thereby reduce vibrations of the damping target. On the other hand, as a linear actuator, there is known a linear actuator in which an elastic supporting section (plate spring) supports a movable element at a fixed position and elastically transforms itself to thereby support the movable element (for example, refer to Japanese Unexamined Patent Application, First Publication No. 2004-343964). In this linear actuator, no wear or sliding resistance occurs on the movable element, and even after use for a long period of time, the precision of the bearing support does not decrease, and a high level of reliability can be attained. Furthermore, there is no power consumption loss caused by sliding resistance, and an improvement in the performance can be achieved. Moreover, the elastic supporting section avoids interference with a coil and is supported on a stator in a position that is away from the coil with the movable element as a base point. Thus, it becomes possible to arrange the voluminous coil and the elastic supporting section in close proximity to each other, and therefore, a reduction in the size of the linear actuator can be realized.

Furthermore, there is known a damping apparatus which, in order to optimize damping control, prepares a plurality of data maps of amplitude and phase data according to the operating state of the automobile, and generates signals for driving the actuator that dampens vibrations based on the amplitude/phase data from the data maps which is taken out according to the operating state of the automobile (for example, refer to Japanese Unexamined Patent Application, First Publication No. H11-259147). Moreover, adaptive filters are a technique for performing damping while following the changes in the state of an automobile, and as examples of which, there are known adaptive filters realized in time domain (for example, refer to Japanese Unexamined Patent Application, First Publication No. H10-49204, and Japanese Unexamined Patent Application, First Publication No. 2001-51703) and adaptive filters realized in frequency domain (for example, refer to "Application techniques of adaptive filters", Toshifumi Kosaka, The Journal of the Acoustical Society of Japan, volume 48, No. 7, P. 520). In any method that uses adaptive filters, control is performed such that the amplitude phase for suppressing vibrations is found by itself based on error signals (for example, acceleration signals) at a specific measuring point.

However, there is a problem in that since the operation of adaptive filter processing takes a long time, the damping effect is degraded if sudden changes occur in engine revolution speed, and in particular, the method realized in the frequency domain takes a long time for processing. There is also a problem in that if there are characteristic changes or age related changes that would cause changes in the transfer function from the command values for the actuator to the signals at the measuring point (acceleration), the damping characteristic is degraded. On the other hand, with the method that makes reference to the map data to perform control, processing time can be reduced and it is therefore possible to improve response. However, there is a problem in that individual differences or age related changes of the actuator used for the control or the damping target engine cause degradation in the damping performance.

Furthermore, in the case where an auxiliary mass (weight) is attached to the linear actuator, and the reaction force that occurs when vibrating this auxiliary mass is used to perform damping control for suppressing vibrations of the target device, an amplitude command value and frequency command value are found based on the vibration state value of the control target device, and the value of current to be applied to the linear actuator is controlled according to this amplitude command value and frequency command value. By attaching such a damping apparatus to the body of an automobile, the force from the engine of the automobile being applied to the automobile body can be cancelled out, and therefore it is possible to reduce vibrations of the automobile body.

However, there is a problem in that if there is occurring an external force (disturbance) that is close to the natural frequency determined from the auxiliary mass fixed on the movable element and the plate spring that holds this movable element, or if a driving command value that is close to the natural frequency is inputted, then excessive amplitude occurs due to resonance, and a force greater than the required reaction force for damping occurs, making the linear actuator unable to perform appropriate vibration suppression control.

Moreover, there is a problem in that since there is structurally provided a stopper of the movable element in order to limit the movable range of the movable element, in the case where changes in the behavior of the automobile become significant as a result of the automobile suddenly accelerating or traveling over a rough road surface, an external force acts on the auxiliary mass. Consequently, excessive amplitude occurs so that there is a problem in that a phenomena where the movable element collides with the stopper occurs. Furthermore there is a problem in that, in the case where changes in the behavior of the automobile are significant, changes in current for driving the linear actuator also becomes more significant proportionately, and the movable element consequently collides with the stopper. If the movable element collides with the stopper, the sound of collision occurs as an abnormal noise. Also there is a problem in that if too many collisions occur between the movable element and the stopper, there will be a greater chance of reduced lifetime of the components that constitute the linear actuator.

DISCLOSURE OF INVENTION

Problems to be Solved by the Invention

The present invention takes the above circumstances into consideration, and its object is to provide a damping apparatus for an automobile and a control method thereof, capable of ensuring a high level of reliability while obtaining an excellent damping effect with a simple configuration.

Moreover, an object is to provide a damping apparatus and a vibration suppression method, capable, even when the state of the excitation source changes, of maintaining vibrations in a state the same as that before the change occurred.

Furthermore, an object is to provide a damping apparatus for an automobile and a vibration control method, capable of reducing negative impact of individual differences or age related changes on damping performance while being capable of maintaining excellent damping performance even for sudden changes in engine revolution speed.

Moreover, an object is to provide a damping apparatus and a control method of the damping apparatus, capable of suppressing resonance phenomena and maintaining the vibration amplitude of the auxiliary mass within an appropriate range to thereby realize ideal vibration suppression.

Furthermore, an object is to provide a damping apparatus and a control method of the damping apparatus, capable of suppressing generation of an abnormal noise by limiting the vibration amplitude of the auxiliary mass within an appropriate range.

Means for Solving the Problem

The present invention provides a damping apparatus for an automobile that reduces vibrations of an automobile body, including: an actuator that is attached to the automobile body and drives an auxiliary mass; a current detector that detects a current flowing through an armature of the actuator; a section that detects a terminal voltage applied to the actuator; a calculation circuit that calculates an induced voltage of the actuator, and further calculates at least one of a relative velocity, a relative displacement, and a relative acceleration of the actuator, based on a current detected by the current detector and the terminal voltage; and a control circuit that controls activation of the actuator, based on at least one of the relative velocity, the relative displacement, and the relative acceleration of the actuator calculated by the calculation circuit.

According to the present invention, the current flowing through the actuator that is attached to an automobile body and drives the auxiliary mass is detected, the terminal voltage applied to the actuator is detected, then based on the detected current and the detected terminal voltage, the induced voltage of the actuator is calculated, and at least one of the relative velocity, relative displacement, and relative acceleration of the actuator is further calculated, and based on at least one of the calculated relative velocity, relative displacement, and relative acceleration of the actuator, the actuator is drive-controlled. Therefore, for detecting the calculated relative velocity, relative displacement, and relative acceleration between the movable section of the actuator and the fixation section, there is no need for using sensors that are exposed to a high temperature environment. As a result, a high level of reliability can be ensured. Moreover, with use of displacement information such as relative velocity, relative displacement, and relative acceleration of the actuator, a spring effect can be obtained. Furthermore, with use of calculated velocity information, a damper effect can be obtained. Moreover, by performing a feed back control with use of velocity information (relative velocity) obtained in calculation, it is possible to make the resonance characteristic of the actuator gradual, so that even if the resonance frequency of the actuator changes, since the gain characteristic and phase characteristic are gradual, changes in response with respect to command signals are small, and influence on the control performance can be made small.

The present invention provides a damping apparatus that suppresses unwanted vibrations and generates predetermined vibrations as necessary, including: an excitation section that excites a damping target object by vibrating an auxiliary mass supported by a linear actuator; a frequency detection section that detects a frequency of an excitation source that oscillates the damping target object; a vibration detection section that detects vibrations at a measuring point; a calculation section that finds command values of vibrations to be suppressed and vibrations to be generated, based on a frequency of the excitation source and a vibration detected at the measuring point; and a control signal output section that outputs a control signal, in which the command value of vibrations to be suppressed and the command value of vibrations to be generated are superimposed, to the excitation section.

According to the present invention, it is possible to suppress unwanted vibrations while generating predetermined vibrations as necessary, and therefore there an effect can be obtained where there is no imparting of discomfort associated with vibration control.

The present invention provides a damping apparatus for an automobile including: an excitation section that vibrates an auxiliary mass; a state information acquisition section that acquires information indicating an operating state of an automobile; a mapping control section that reads out an excitation force command value according to the operating state information acquired by the state information acquisition section from a damping information table where the operating state information and a command value for generating an excitation force by the excitation section are associated with each other, and that controls the excitation section based on the excitation force command value; a vibration detection section that detects a vibration state value indicating a vibration state of a damping target at a measuring point; an adaptive control section that finds an excitation force command value by using an adaptive filter according to the vibration state detected by the vibration detection section, and controls the excitation section based on the excitation force command value; and a control switching section that switches to control of the excitation section by the adaptive control section in a case where a vibration state value detected by the vibration detection section exceeds a predetermined value during control of the excitation section by the mapping control section.

According to the present invention, control is switched to an adaptive filter in the case where damping control performance of the mapping control is degraded due to the influence of individual differences or age related changes. Consequently, the damping performance can be improved. Moreover, since the mapping data of mapping control is updated according to the control with an adaptive filter, the damping performance with mapping control can be recovered. Furthermore, since the type is switched according to the revolution speed change rate while performing adaptive filter, it is possible to select an appropriate adaptive filter when changes occur to the engine revolution speed, to perform damping control. Furthermore, since the transfer function required in the time domain adaptive filter is updated with the calculation process of the frequency domain adaptive filter, it is possible to prevent the characteristics of the time domain adaptive filter from being degraded due to changes in the transfer function.

The present invention provides a damping apparatus that includes an actuator that drives an auxiliary mass held by spring elements, with respect to a damping target section, and that suppresses vibrations of the damping target section by using a reaction force at the time of driving the auxiliary mass, the damping apparatus further including a resonance suppression section of the actuator based on an ideal actuator inverse characteristic that uses a transfer function of a vibration velocity with respect to an excitation force of a vibrating system of the actuator.

According to the present invention, since there is provided the resonance suppression section of the actuator based on the ideal actuator inverse characteristic that uses the transfer function of the vibration velocity with respect to an excitation force of the vibrating system of the actuator, it is possible to achieve an effect where the actuator characteristic can be adjusted to an arbitrary characteristic by setting the ideal actuator inverse characteristic based on a desired characteristic. As a result, by increasing the damping characteristic of the desired characteristic, it is possible to attain a characteristic such that resonance in the movable section of the actuator is unlikely to be generated by an external force that acts on the actuator main unit. Therefore, an appropriate reaction force can be generated to thereby realize ideal vibration suppression. Moreover, since it is possible to reduce the apparent natural frequency of the actuator by reducing the natural frequency of the desired characteristic, then even in the vicinity of the natural frequency of the actual actuator, it is possible to realize stable damping control without receiving the influence of the spring characteristic and the like. Furthermore, since it is possible to maintain the movable range of the movable element of the actuator within an appropriate range, the movable element does not collide with the stopper. As a result, generation of collision sound can be suppressed.

The present invention provides a damping apparatus including: an auxiliary mass member supported by a spring element; an actuator that vibrates the auxiliary mass member; and a control section that controls a current applied to the actuator in order to suppress vibrations of a vibration damping target by using a reaction force when vibrating the auxiliary mass member with the actuator, wherein the control section further includes an amplitude amount control section that performs control for limiting a value of a current applied to the actuator, so that a vibration amplitude of the auxiliary mass member does not exceed a predetermined value in a case of controlling current applied to the actuator based on an amplitude command value and a frequency command value of vibrations to be generated.

According to the present invention, in the case of controlling the current applied to the actuator based on the amplitude command value and the frequency command value of the vibrations to be generated, the value of current applied to the actuator is limited so that the vibration amplitude of the auxiliary mass member does not exceed a predetermined value. Therefore, it is possible to obtain an effect where the movable element of the actuator can be constantly driven within an appropriate movable range. As a result collision between the movable element and the stopper is eliminated, and hence generation of a collision sound can be suppressed.

REFERENCE SYMBOLS

30: Excitation section, 31: Linear actuator, 32: Auxiliary mass, 33: Relative velocity sensor, 40: Engine, 41: Automobile body frame, 43: Vibration sensor, 50: Upper level controller, 60: Stabilizing controller, 70: Power circuit

BEST MODE FOR CARRYING OUT THE INVENTION

Hereunder, preferable embodiments of the present invention are described, with reference to accompanying drawings. However, the present invention is not limited by the respective embodiments described below, and for example, associated components of these embodiments may be appropriately combined.

First Embodiment

Figure 1:
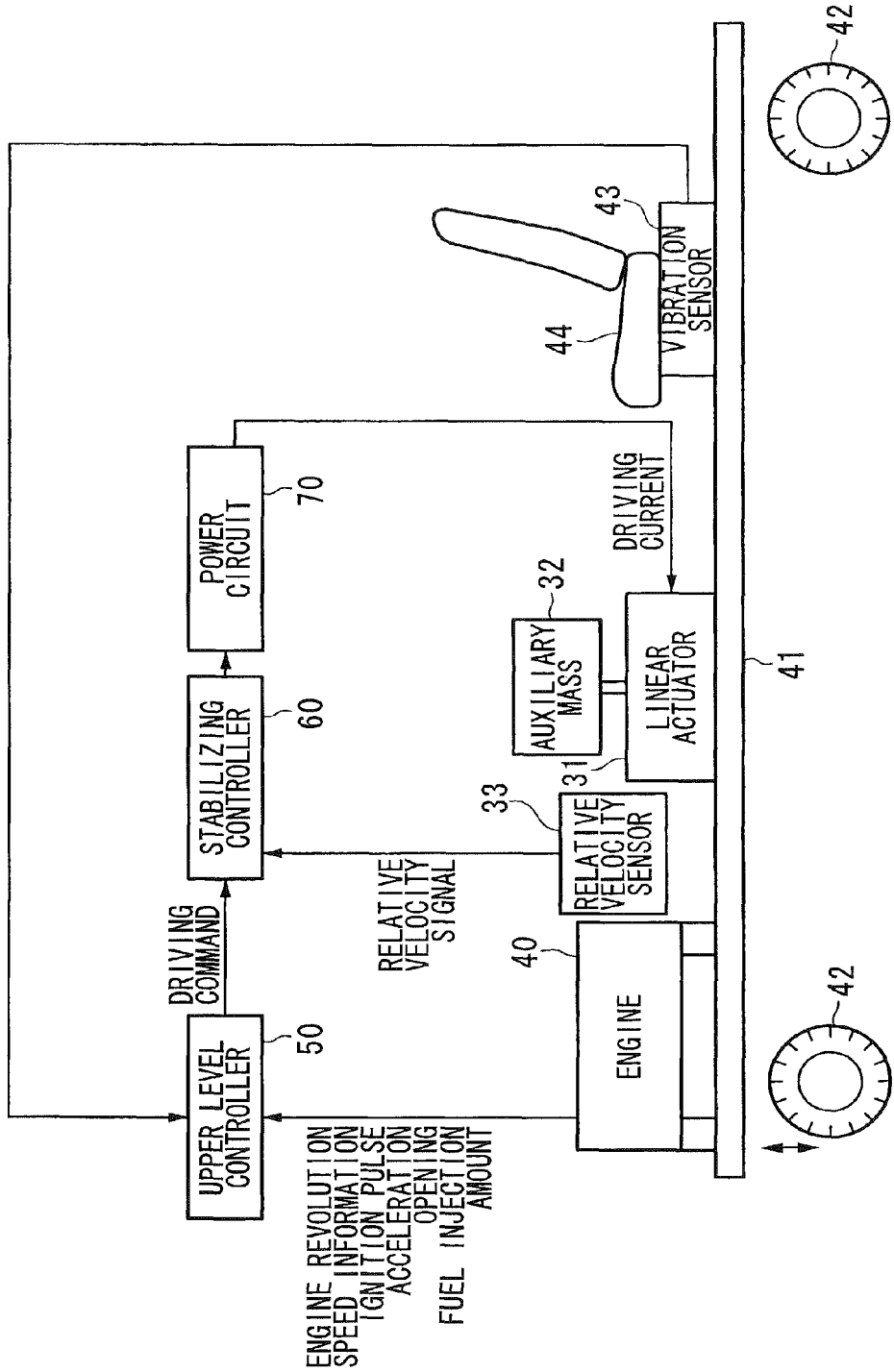
FIG. 1 is a block diagram showing a configuration of an automobile damping apparatus according to a first embodiment of the present invention.

FIG. 1 is a block diagram showing a configuration of a damping apparatus according to a first embodiment of the present invention. In the present embodiment, a case is described where the damping apparatus is applied to an automobile as an example. In FIG. 1, reference symbol 31 denotes a linear actuator that reciprocates an auxiliary mass 32. The auxiliary mass 32 reciprocates in a direction the same as that of vibrations to be suppressed. Reference symbol 33 denotes a relative velocity sensor that detects a relative velocity between the linear actuator 31 and the auxiliary mass 32. Reference symbol 40 denotes an engine of an automobile that is fixed on an automobile body frame 41. Reference symbol 42 denotes wheels of the automobile. Reference symbol 43 denotes a vibration sensor (acceleration sensor) provided in a predetermined position of a passenger seat 44 or the automobile body frame 41. Reference symbol 50 denotes an upper level controller that receives input of engine revolution speed information such as ignition pulse, accelerator opening, and fuel injection amount from a control device (not shown in the drawing) provided in the engine 40, and an output from the vibration sensor 43, and outputs a driving command to the linear actuator 31 for performing damping. The upper level controller 50 generates and outputs a command signal (driving command) for suppressing vibrations of the automobile body frame 41 generated by engine revolutions. Reference symbol 60 denotes a stabilizing controller that receives input of a relative velocity signal output from the relative velocity sensor 33 and a driving command output from the upper level controller 50, and stably drives the linear actuator 31. Reference symbol 70 denotes a power circuit that outputs a driving current to the linear actuator 31, based on a stabilizing driving command output from the stabilizing controller 60.

The damping apparatus shown in FIG. 1 uses the reaction force that occurs when the auxiliary mass 32 attached to the linear actuator 31 is reciprocated, to suppress vibrations that occur in a predetermined position of the automobile body frame 41 or the automobile body due to revolutions of the engine 40. At this time, the stabilizing controller 60 receives input of a signal of a relative velocity between the body of the linear actuator 31 fixed on the automobile body 41 and the auxiliary mass 32 that reciprocates, and feeds it back to a driving command. As a result a damping force is generated for the linear actuator 31 to reduce the sensitivity with respect to disturbance vibrations that the automobile body frame 41 receives due to uneven road surfaces. As a result, the influence of disturbance vibrations can be reduced.

The relative velocity sensor 33 may differentiate the output of a phase sensor that detects strokes of the linear actuator 31 to thereby detect the relative velocity. Moreover, the relative velocity sensor 33 may be such that it detects the relative velocity from a difference between integrated values from the acceleration sensors respectively provided on the linear actuator 31 and the auxiliary mass 32.

Figure 26:
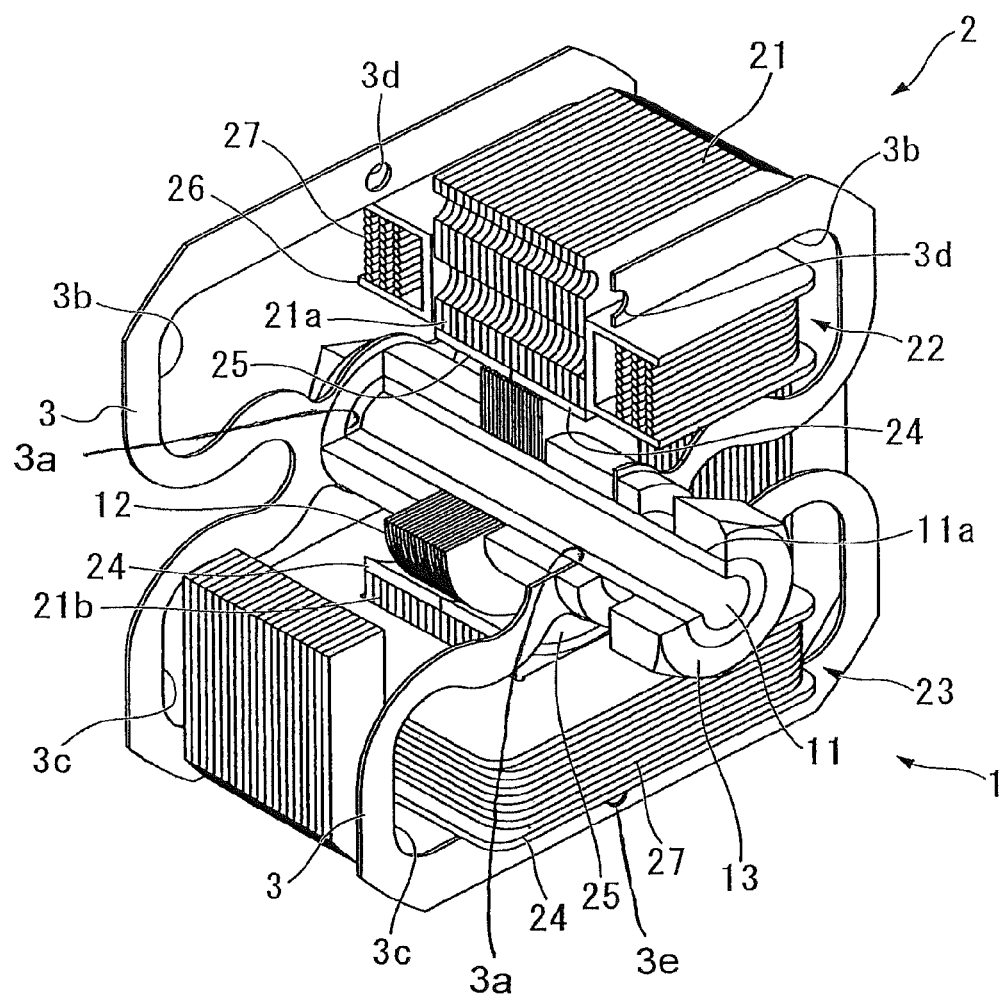
FIG. 26 is a perspective view showing a configuration of the linear actuator.

Here, a configuration of the linear actuator (reciprocating motor) used in the present invention is described, with reference to FIG. 26. As shown in FIG. 26, the linear actuator includes a movable section 1, a stator 2 arranged around the movable section 1, and a pair of supporting members (elastic supporting members) 3 having two or more superposed plate springs that support the movable section 1 and allowing the movable section 1 to reciprocate with respect to the stator 2 by elastically deforming themselves.

The movable section 1 includes a shaft 11 of a column shape having a female screw section 11a formed on the tip end thereof, and that reciprocates in the axial direction, and a movable element 12 inside of which the shaft 11 is inserted and which is fixed in a position partway along the axial direction of the shaft 11 and which serves as a movable magnetic pole. A nut 13 for fixing the shaft 11 to a target object (not shown in the drawing) to be driven is threaded on the female screw section 11a.

The stator 2 includes a yoke 21, the outer shape of which seen from the axial direction of the shaft 11 is of a rectangle shape and has no bottom end thereinside and a pair of coils 22 and 23 that are arranged so as to have the movable section 1 therebetween and are fixed inside the yoke 21. The coil 22 is configured such that a winding drum 26 is attached to a magnetic pole section 21a of the yoke 21 which is formed so as to project inward, and a metal wire 27 is multiple-wound on this winding drum 26. The coil 23 is configured such that a winding drum 26 is similarly attached to a magnetic pole section 21b formed in a position opposing to the magnetic pole 21a across the stator 1, and a metal wire 27 is multiple-wound on this winding drum 26.

On the tip end surface of the magnetic pole section 21a facing the movable section 1 there are fixed permanent magnets 24 and 25 arranged in the axial direction of the shaft 11. Also on the tip end surface of the magnetic pole section 21b facing the movable section 1 there are fixed permanent magnets 24 and 25 arranged in the axial direction of the shaft 11. These permanent magnets 24 ad 25 are formed with tile shaped rare-earth magnets or the like having the same axis, diameter, and length, and are arranged adjacent to each other in the axial direction. Here, these permanent magnets 24 and 25 have radial anisotropy in which the magnetic poles are arranged orthogonal to the axial direction, and the arrangement of the magnetic poles is such that they are mutually opposite. Specifically, as for the permanent magnet 24, the N pole thereof is arranged on the outer diameter side and the S pole thereof is arranged on the inner diameter side, and as for the other permanent magnet 25, the N pole thereof is arranged on the inner diameter side and the S pole thereof is arranged on the outer diameter side.

The two plate springs 3 are distanced from each other in the axial direction of the shaft 11, and are arranged so as to have the yoke 21 therebetween. These two plate springs 3 are of the same shape punch-formed from a metal plate having a uniform thickness, and are formed in a "number 8" shape when seen from the axial direction of the shaft 11. In the location corresponding to the center portion where the lines of the "number 8" shape intersect with each other, there is respectively formed a through hole 3a that supports the tip end or rear end of the shaft 11. Moreover, in the locations corresponding to areas inside the round portions of the "number 8" shape, there are respectively formed through holes 3b and 3c that sufficiently allow the above mentioned coil 22 or 23 to be inserted therethrough. Furthermore, in the locations corresponding to the top most portion and bottom most portion of the "number 8" shape, there are respectively formed small holes 3d and 3e for fixing the plate springs 3 to the yoke 21.

Each of the plate springs 3 supports the shaft 11 in a position partway along the axial direction of the coil 22. To describe in further detail, one of the plate springs 3 that supports the tip end of the shaft 11 is fixed with the tip end side of the shaft 11 inserted through the through hole 3a, and is fixed to the yoke 21 in a position further from the center of the shaft 11 than the coil 22 or 23, with a screw passing through the small hole 3d and a screw passing through the small hole 3e. Moreover, the other plate spring 3 that supports the rear end of the shaft 11 is fixed with the rear end side of the shaft 11 inserted through the through hole 3a, and is fixed to the yoke 21 in a position further from the center of the shaft 11 than the coil 22 or 23, with screws passing through the small holes 3d and 3e.

The one plate spring 3 is such that the coil 22 projects from the through hole 3b towards the tip end side of the shaft 11 and the coil 23 projects from the through hole 3c towards the tip end side of the shaft 11, and the other plate spring 3 is such that the coil 22 projects from the through hole 3b towards the rear end side of the shaft 11 and the coil 23 similarly projects from the through hole 3c towards the rear end side of the shaft 11. The gap between these two plate springs 3 along the axial direction of the shaft 11 is narrower than the dimension of the coil 22 or 23, and the through holes 3b and 3c serve as "clearances" to avoid interference with the coil 23.

Rather than slidably and reciprocatably supporting the movable element as conventionally practiced, each of the plate springs 3 supports the movable section 1 in two positions on the tip end side and the rear end side of the shaft 11, and they elastically deforms themselves to thereby support the movable section 1 while allowing it to reciprocate in the axial direction of the shaft 11. Pre-adjustments such as increasing the distance between the through hole 3a for supporting the shaft 11 and the small hole 3d or 3e (the length of the plate spring itself, not the direct distance) to the possible maximum length, or reducing the plate thickness, are performed, so that the amount of deformation in each of the plate springs 3 when the movable section 1 reciprocates, becomes smaller than the amount of deformation that leads to a possibility of breakage due to the fatigue caused by repetitive forced elastic deformation thereof. However, when the entire linear actuator is seen from the axial direction of the shaft 11, the outer shape of each of the plate springs 3 is in a size that does not allow it to stick out from the outer shape of the yoke 21.

The behavior of an operation of the linear actuator configured in this way is described below. If an alternating current (sinusoidal current, square-wave current) is applied to the coils 22 and 23 in a state where a current flows through the coils 22 and 23 in a predetermined direction, a magnetic flux is guided, in the permanent magnet 24, from the south pole to the north pole, and a magnetic flux loop that circulates through an outer circumference section of the yoke 21, the magnetic pole section 21a, the permanent magnet 24, the movable element 12, the shaft 11, and the outer circumference section of the yoke 21, in this order is thereby formed. As a result, a force acts on the movable section 1 in the axial direction from the rear end to the tip end of the shaft 11, and the movable section 1 is pushed by this force and moved in the same direction. On the other hand, in a state where a current flows through the coils 22 and 23 in a direction opposite to the above mentioned predetermined direction, a magnetic flux is guided, in the permanent magnet 25, from the south pole to the north pole, and a magnetic flux loop that circulates through the outer circumference section of the yoke 21, the magnetic pole section 21a, the permanent magnet 25, the movable element 12, the shaft 11, and the outer circumference section of the yoke 21, in this order is thereby formed. As a result, a force acts on the movable section 1 in the axial direction from the tip end to the rear end of the shaft 11, and the movable section 1 is pushed by this force and moved in the same direction. The flow directions of the currents flowing into the coils 22 and 23 are alternately changed by the alternating current, and the movable section 1 thereby repeats the above operation and reciprocates in the axial direction of the shaft 11 with respect to the stator 2.

In the above linear actuator, rather than slidably and reciprocatably supporting the movable section, each of the plate springs 3 supports the movable section 1 in two positions on the tip end side and the rear end side of the shaft 11, and they elastically deforms themselves to thereby support the movable section 1 while allowing it to reciprocate in the axial direction of the shaft 11. As a result, no wear or sliding resistance occurs on the movable section 1. Therefore, even after use for a long period of time, the precision of the bearing support does not decrease, and a high level of reliability can be attained. Furthermore, there is no power consumption loss caused by sliding resistance, and an improvement in the performance can be achieved. Moreover, in the above linear actuator, each of the plate springs 3 avoids interference with the coils 22 and 23 and is supported by the stator 2 in a position that is away from the coils 22 and 23 with the movable element as a base point. As a result, it becomes possible to arrange the voluminous coils 22 and 23 and the two plate springs 3 in close proximity to each other. Therefore, a reduction in the size of the linear actuator can be realized.

Figure 2:
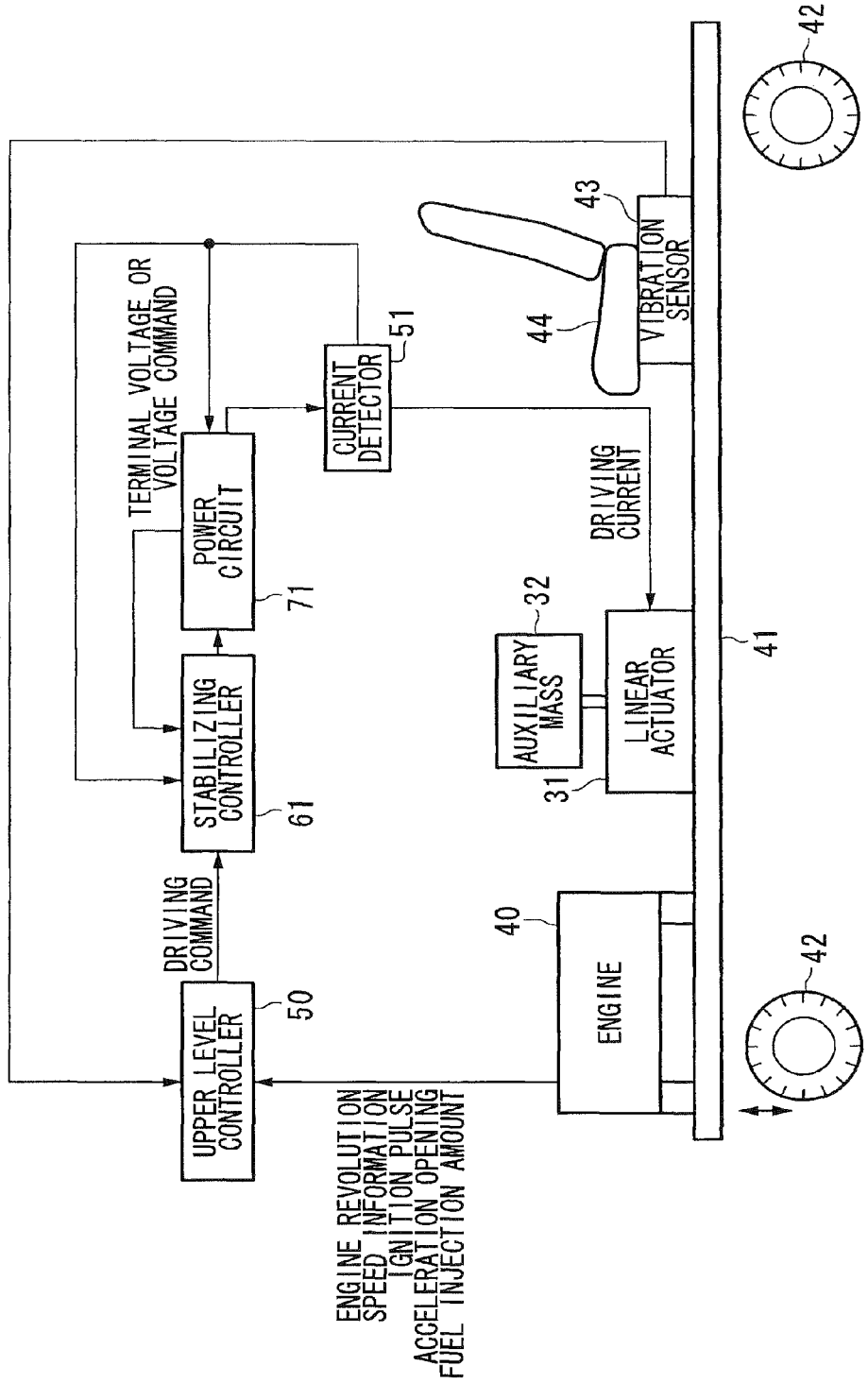
FIG. 2 is a block diagram showing a configuration of a modified example of the first embodiment shown in FIG. 1.

Next, a modified example of the damping apparatus shown in FIG. 1 is described, with reference to FIG. 2. The apparatus shown in FIG. 2 differs from the apparatus shown in FIG. 1 in that instead of having the relative velocity sensor 33, there is provided a current detector 51 that detects a driving current, and stabilization is realized based on the current detected by the current detector 51. A stabilizing controller 61 estimates an induced voltage generated by the linear actuator 31 according to a coil current (driving current) of the linear actuator 31, a voltage command or a terminal voltage output from a power circuit 71, or the like, and based on this, it estimates a relative velocity between the linear actuator 31 and the auxiliary mass 32. This estimation value is fed back and a damping force is thereby generated in the linear actuator 31. As a result, the influence of disturbance vibrations can be reduced.

For the terminal voltage, a signal found by multiplying a voltage command by a voltage amplifier gain may be used in a voltage amplifier included in the power circuit 71.

Figure 6:
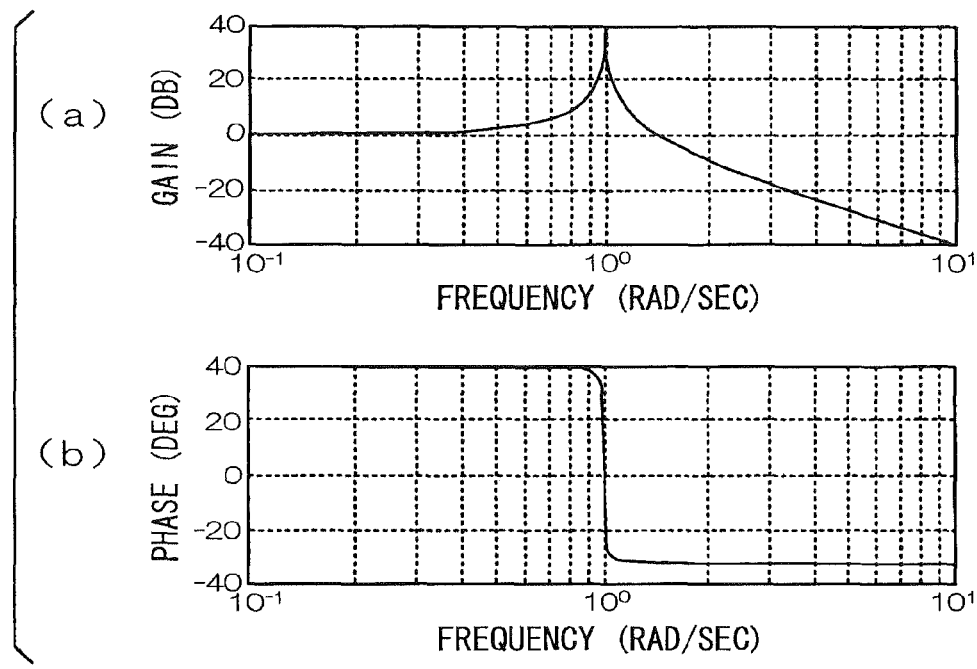
FIG. 6 is diagrams showing gain characteristics and phase characteristics as examples of a response of the linear actuator to a command signal (induced voltage feedback not present).
Figure 7:
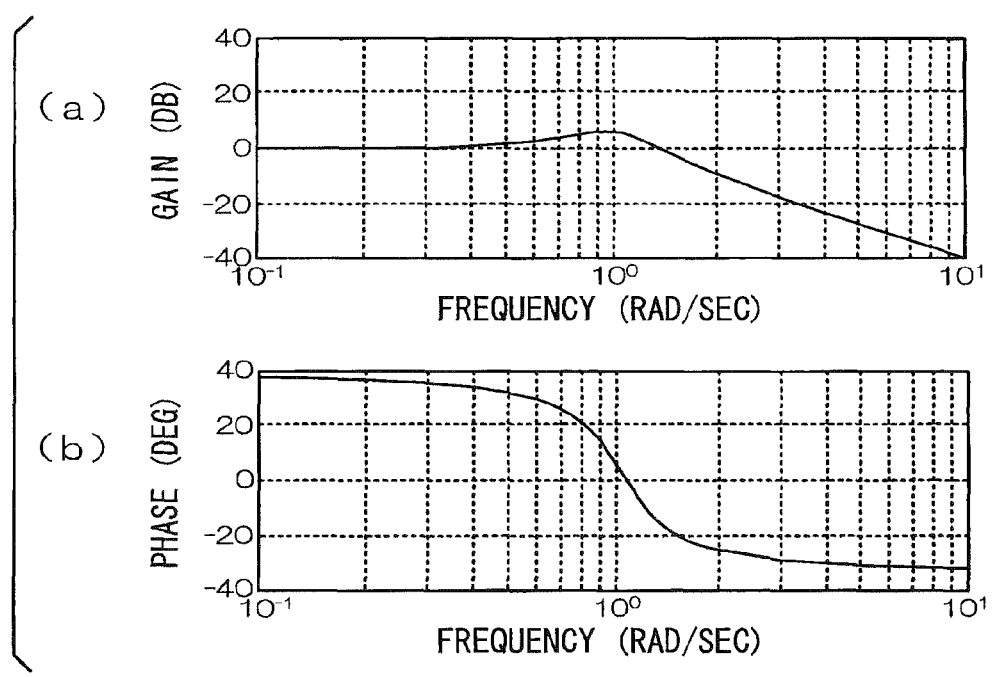
FIG. 7 is diagrams showing gain characteristics and a phase characteristics as examples of a response of the linear actuator to a command signal (induced voltage feedback present).

FIGS. 6 (a) and (b) are diagrams showing a gain characteristic and a phase characteristic as examples of responses of the linear actuator (induced voltage feed back absent) having a spring element for supporting the auxiliary mass, with respect to a command signal. FIGS. 7 (a) and (b) are diagrams showing a gain characteristic and a phase characteristic as examples of a response of the linear actuator with respect to a command signal (induced voltage feed back present, or relative velocity feed back present).

In the case where induced voltage feed back is absent, then with respect to changes in the resonance frequency of the actuator, changes in the gain characteristic shown in FIG. 6 (a) and the phase characteristic shown in FIG. 6 (b) are steep. On the other hand, it can be seen that in the damping apparatus for an automobile according to the present embodiment, by performing induced voltage feed back (feed back control with use of velocity information), the gain characteristic shown in FIG. 7 (a) and the phase characteristic shown in FIG. 7 (b) are moderate even if the resonance frequency of the actuator changes, and therefore changes in the response with respect to the command signal become smaller and an influence on control performance becomes smaller.

Moreover, by performing a feed back control with use of velocity information obtained by calculation, the resonance characteristic of the actuator becomes moderate. Therefore, even if the resonance frequency of the actuator changes, the gain characteristic and the phase characteristic are moderate, and hence changes in response with respect to the command signals are small, and influence on the control performance can be reduced.

Second Embodiment

Figure 3:
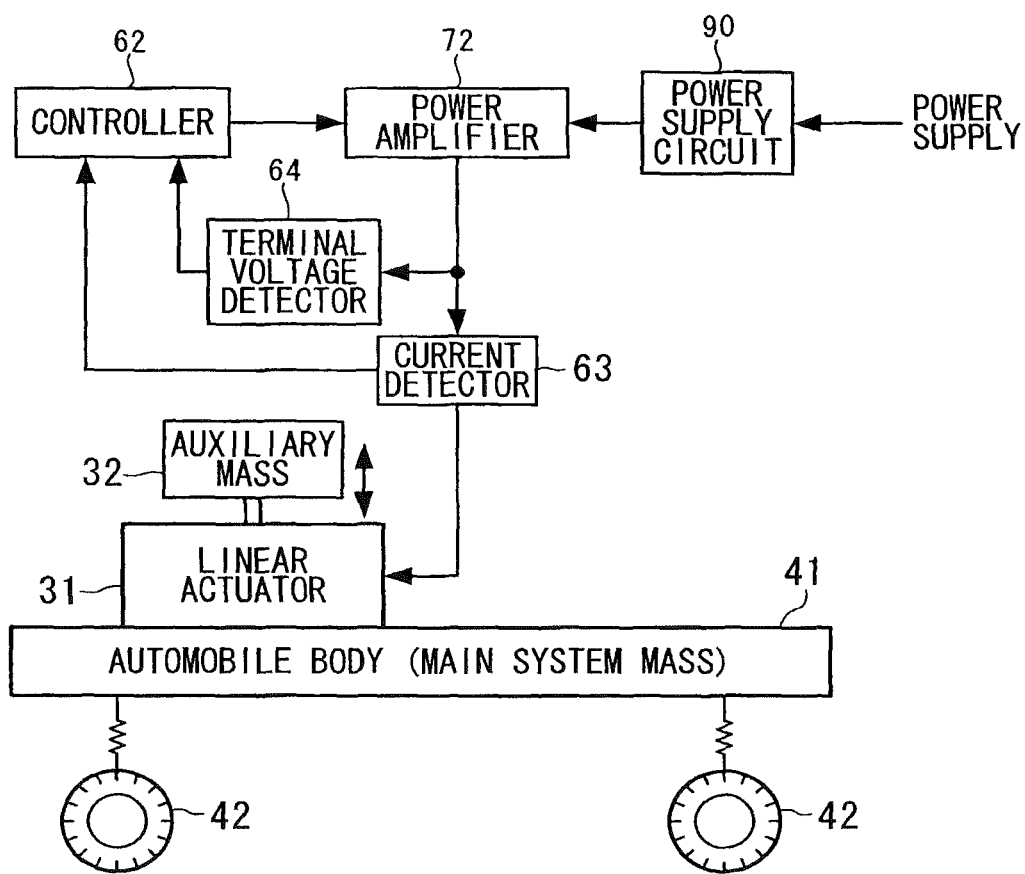
FIG. 3 is a block diagram showing a configuration of an automobile damping apparatus according to a second embodiment of the present invention.

Next, a configuration of a damping apparatus according to a second embodiment of the present invention is described. FIG. 3 is a block diagram showing a configuration of the damping apparatus according to the second embodiment. In FIG. 3, the damping apparatus is connected to an automobile body frame (main system mass) 41 serving as a control object, and controls (damps) vibrations in the vertical direction (gravitational direction) that occur in the body frame (main system mass) 41.

The damping apparatus in the present embodiment is a so-called active dynamic vibration absorber, and includes a current detector 63 that detects driving current to a linear actuator 31, a terminal voltage detector 64 that detects terminal voltage of the linear actuator 31, and the linear actuator 31 that drives based on detection results of the current detector 63 and the terminal voltage detector 64. The damping apparatus uses the driving force of the linear actuator 31 to drive the auxiliary mass 32 in the vertical direction (the direction of vibrations to be damped), and applies to the main system mass 41 an inertial force of the auxiliary mass including the auxiliary mass 32 as a reaction force, thereby suppressing vibrations of the main system mass 41.

The current detector 63 shown in FIG. 3 detects the current supplied to the linear actuator 31 and supplies this to a controller 62. Moreover, the terminal voltage detector 64 detects the terminal voltage applied to the linear actuator 31, and supplies this to the controller 62. In the case where the linear actuator 31 is driven, the linear actuator 31 generates an induced electromotive force proportional to velocity. By calculating this induced electromotive force, a velocity signal can be obtained. Moreover, it is possible to obtain a vibration displacement signal by integration processing it, and to obtain vibration acceleration by differentiation processing it.

Figure 4:
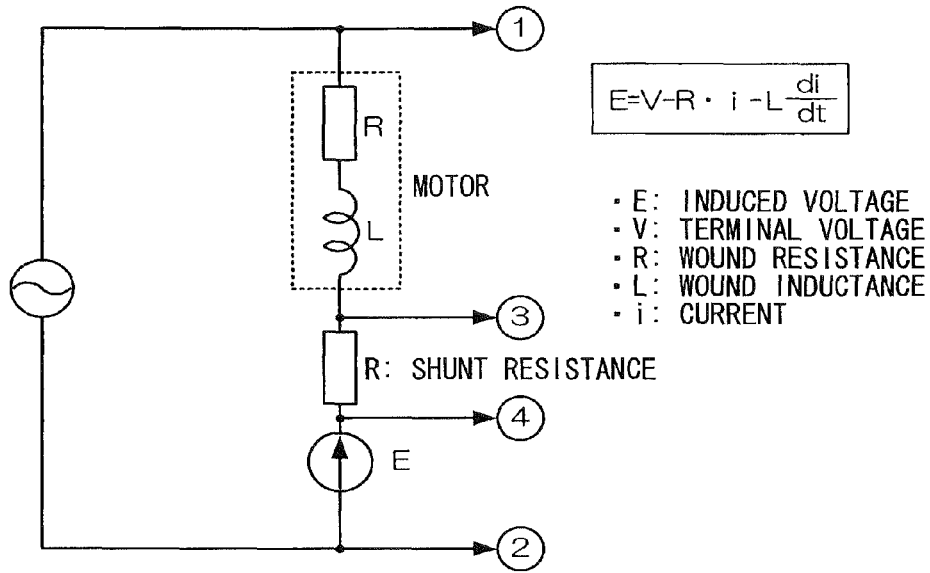
FIG. 4 is a conceptual diagram showing a method of detecting an induced electromotive force of a linear actuator in the second embodiment.
Figure 5:
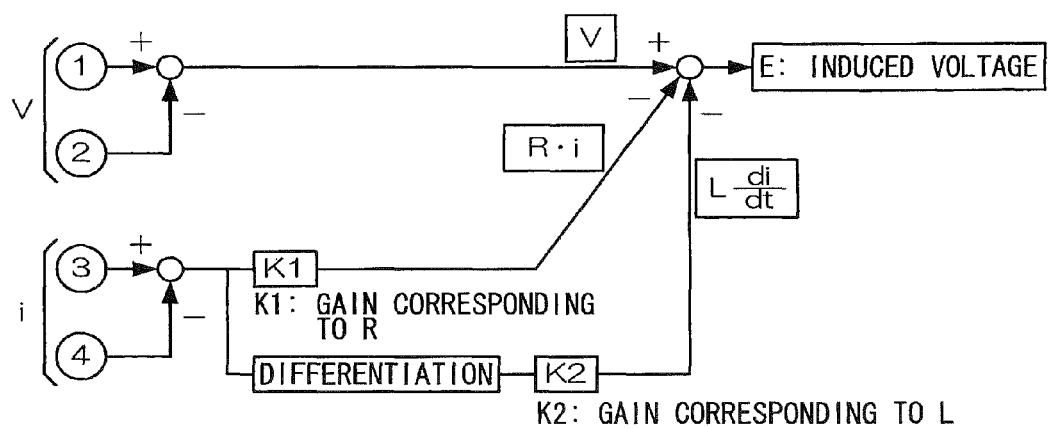
FIG. 5 is a conceptual diagram showing a method of detecting an induced electromotive force of the linear actuator in the second embodiment.

For example, as shown in FIG. 4 and FIG. 5, a terminal voltage V and a current i are detected, and are output as an induced voltage E through an amplifying circuit and a differentiating circuit. In this case, gains K1 and K2 corresponding to a wire wound resistance R and a wire wound inductance L need to be set. This setting is adjusted by applying a current of a predetermined frequency while the movable section of the linear actuator (movable element, auxiliary mass) is in a state of being restrained so that the output becomes zero. Since the relationship $E=V-R \cdot i-L(di/dt)$ holds for the induced voltage E, it is possible to find the induced voltage E by detecting the terminal voltage V and the current i.

In the case where a spring constant close to an optimum value for the dynamic vibration absorber can be obtained by means of the magnetic spring characteristic or mechanical spring element, then by adjusting the damping force that the linear actuator 31 generates, a high level of damping effect can be achieved without supplying energy for damping. The damping force can be adjusted by connecting a load resistance to both ends of the coil of the linear actuator 31 and by changing the level of this load resistance.

The controller 62, based on the induced voltage calculated from the current and terminal voltage detected by the current detector 63 and the terminal voltage detector 64, calculates the relative velocity, relative displacement, or relative acceleration of the linear actuator 31, and derives an optimum driving amount (control amount) of the linear actuator 31 for the damping apparatus to obtain an optimum spring characteristic and damping characteristic for vibration-damping the main system mass 41, and the derived result is output to a power amplifier 72 as a command signal. Electric power is supplied from a power supply circuit 90 to the power amplifier 72. The power amplifier 72, according to the command signal of the controller 62, drives the linear actuator 31, and the linear actuator 31 drives (vibrates) the auxiliary mass 32 in the vertical (gravitational) direction to thereby damp the main system mass 41.

According to the above embodiment, without use of a sensor for detecting the relative displacement, relative velocity, and relative acceleration between the movable section and the fixation section of the actuator, the relative velocity, relative displacement, or relative acceleration of the linear actuator 31 are calculated based on the induced voltage calculated from the current and the terminal voltage of the linear actuator 31, and the linear actuator 31 is controlled based on the relative velocity, relative displacement, or relative acceleration. As a result, a high level of reliability can be ensured.

Moreover, by making use of displacement information obtained by calculation, a spring effect can be obtained. Furthermore, by making use of velocity information obtained by calculation, a damping effect can be obtained.

The terminal voltage may be found from a command value of the voltage to be applied to the actuator.

Figure 8:
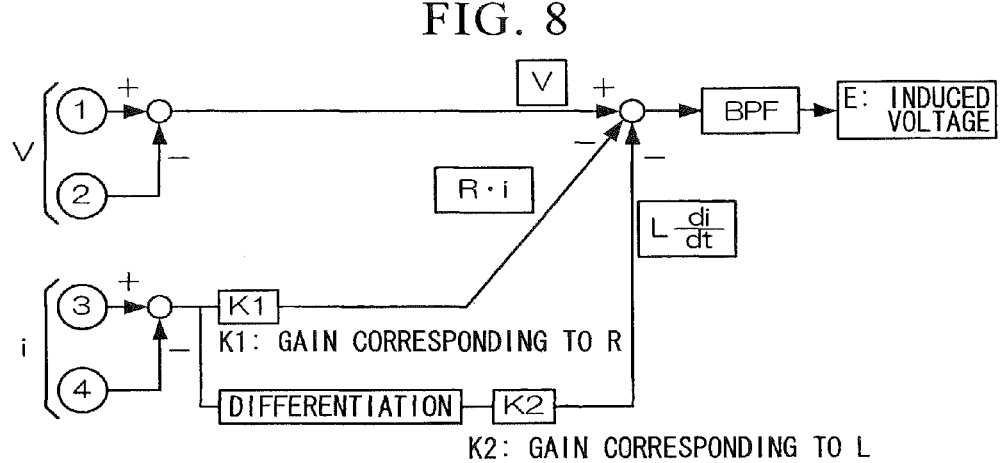
FIG. 8 is a conceptual diagram showing a modified example of the method of detecting an induced electromotive force of the linear actuator shown in FIG. 5.

Next, a modified example of the method of detecting induced electromotive force shown in FIG. 5 is described, with reference to FIG. 8. The method of detecting induced electromotive force shown in FIG. 8 differs from the method of detecting induced electromotive force shown in FIG. 5 in that in order to limit the control bandwidth for suppressing resonance with the feed back of an estimated velocity value to be in the vicinity of the resonance frequency of the linear actuator 31, there is provided a band-pass filter (BPF). This band-pass filter is a filter for obtaining a damping effect only within the vicinity of the resonance frequency of the linear actuator 31 (frequency close to the natural frequency), and the phase of this band-pass filter is set so that it becomes 0° in the vicinity of the resonance frequency of the actuator.

By providing the band-pass filter, the noise component of direct current can be suppressed and it is possible to adjust the phase. Therefore, the certainty of an estimated induced voltage can be improved.

Figure 9:
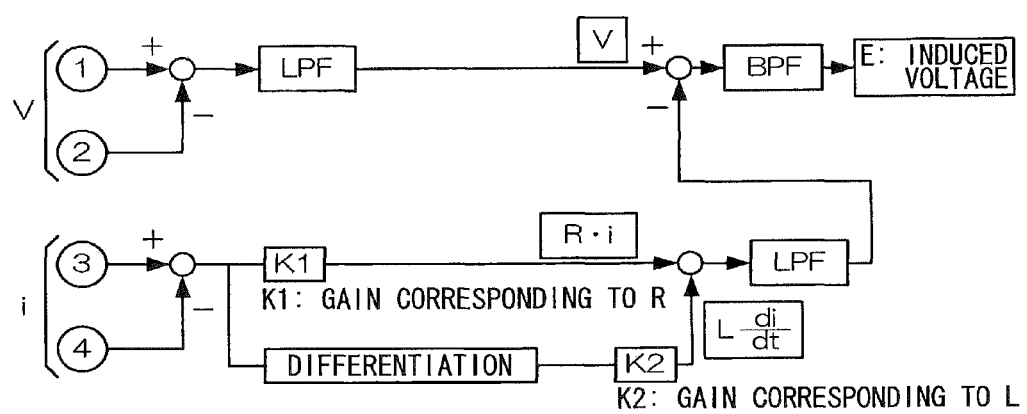
FIG. 9 is a conceptual diagram showing a modified example of the method of detecting an induced electromotive force of the linear actuator shown in FIG. 5.

Next, a modified example of the method of detecting induced electromotive force shown in FIG. 8 is described, with reference to FIG. 9. The method of detecting induced electromotive force shown in FIG. 7 differs from the method of detecting induced electromotive force shown in FIG. 8 in that in order to suppress the high frequency noise component, there are provided two low pass filters (LPF). The cutoff frequency of these low pass filters is set to a frequency higher than the resonance frequency (natural frequency) of the linear actuator 31.

By providing the low pass filters, the high frequency noise component can be removed, and therefore generation of an abnormal noise caused by the noise component can be suppressed.

The damping apparatus for an automobile according to the present invention is effective if attached to the automobile component such as the body frame of the automobile, components in the vicinity of the engine mount or radiator, or to components under a rear luggage carrying section or trunk.

Moreover, the linear actuator 31 is an actuator that uses electromagnetic force, and is effective if it uses a reciprocating motor for example.

As described above, in the actuator in which the movable section is supported with a spring element, even if an external excitation force due to the uneven road surface acts on the actuator while the automobile is traveling, it is possible to suppress generation of excessive displacement caused by the external excitation force or resonance phenomena. Therefore, it is possible to prevent generation of an abnormal noise caused, for example, by the movable section of the actuator colliding with a stopper. Moreover, since it is possible to detect resonance phenomena on the driving circuit side, there is no need to provide a sensor or the like in the actuator main unit, and the actuator main unit can be miniaturized. Furthermore, even in the case where an error occurs in the coil constant due to individual differences or age related changes in the actuator, it is possible to prevent generation of a direct current component of unwanted current in the damping control. Moreover, since the high frequency noise component is not to be amplified, it is possible to reduce the generation level of undesired sound or abnormal noises. Furthermore, since the band-pass filter and low pass filter are provided in the vibration velocity feed back, and are made independent from a current feed back circuit, it is possible to prevent their influence on the response of the actuator with respect to high frequency driving commands.

Third Embodiment

Figure 10:
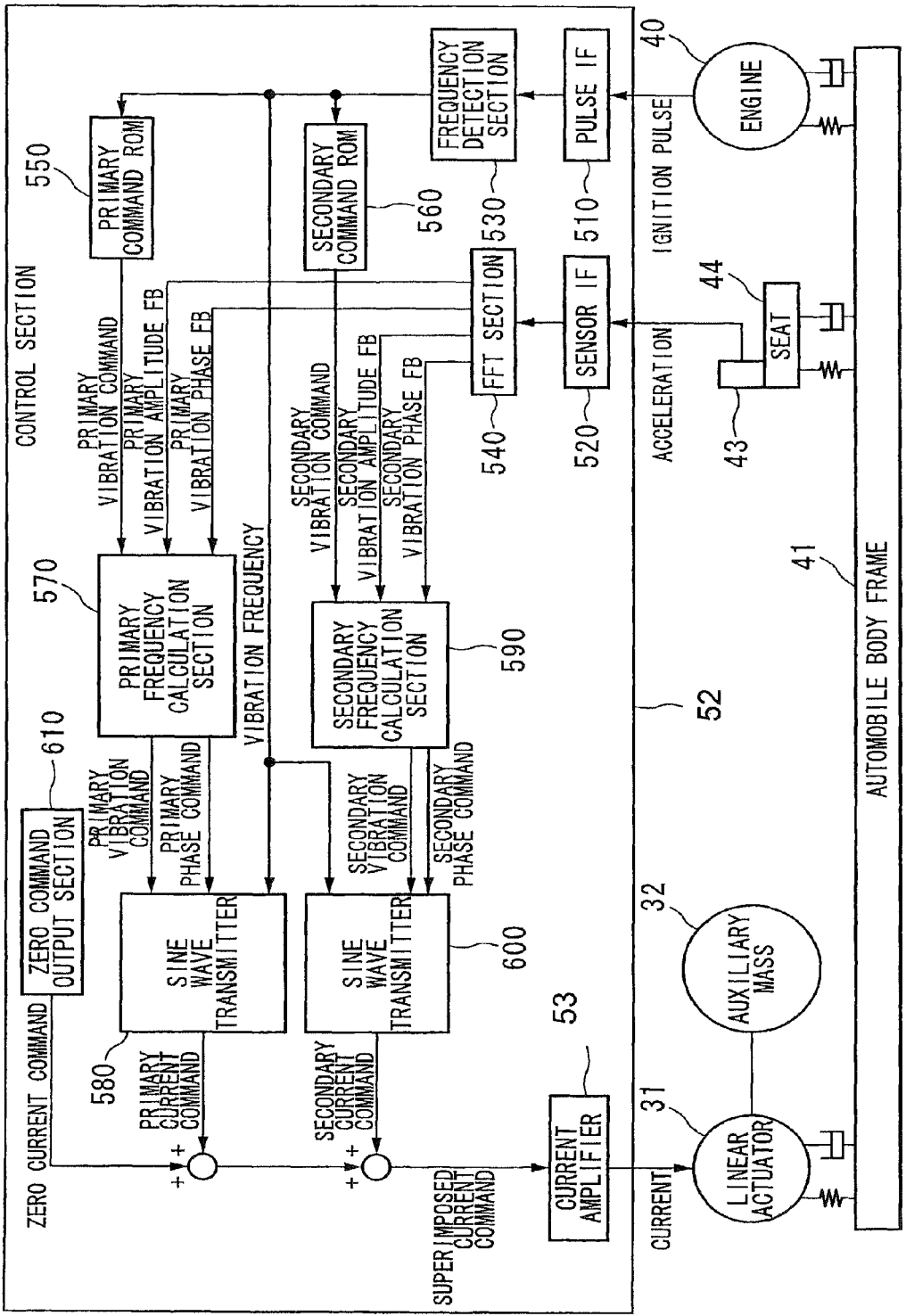
FIG. 10 is a block diagram showing a configuration of a third embodiment of the present invention.

Next, a configuration of a damping apparatus according to a third embodiment of the present invention is described, with reference to the drawing. FIG. 10 is a block diagram showing a configuration of the same embodiment. Here, the present embodiment is described on the assumption that an engine that performs cylinder number control is an excitation source in an automobile. In this diagram, reference symbol 41 denotes an automobile body frame. Reference symbol 40 denotes an engine capable of performing cylinder number control according to the operation state thereof, and this engine 40 is a vibration generating source (excitation source). Reference symbol 44 denotes a seat of a driver's seat (hereunder, simply referred to as seat), and this seat 44 is a point at which vibrations are measured. Reference symbol 43 denotes an acceleration sensor attached to the seat 44, and this detects the acceleration of the seat 44. Reference symbol 31 denotes a linear actuator (reciprocating motor) attached to the automobile body frame 41, and this suppresses vibrations by vibrating an auxiliary mass 32 for damping vibrations generated by the engine 40. Reference symbol 52 denotes a control section that controls driving of the linear actuator 31 based on the vibrations generated by the excitation source and the vibrations detected at the measuring point.

Reference symbol 510 denotes a pulse IF (interface) that receives the input of an ignition pulse to be given to the engine 40. Reference symbol 520 denotes a sensor IF (interface) to which is input an output of the acceleration sensor 43. Reference symbol 530 denotes a frequency detection section that detects the frequency of the inputted ignition pulse. Reference symbol 540 denotes a FFT section that executes FFT (Fast Fourier Transform). It extracts which frequency component and to what extent is it included in an output signal from the acceleration sensor 43, and outputs a phase/amplitude FB (feed back) signal of a primary vibration mode and a phase/amplitude FB signal of a secondary vibration mode. Reference symbol 550 denotes a primary command ROM that pre-stores a command value for generating vibrations for the primary vibration mode, and reads and outputs the command value according to the frequency detected in the frequency detection section 530. Reference symbol 560 denotes a secondary command ROM that pre-stores a command value for generating vibrations for the secondary vibration mode, and reads and outputs the command value according to the frequency detected in the frequency detection section 530.

Reference symbol 570 denotes a primary frequency calculation section to which is input a primary vibration command value read from the primary command ROM 550, and a primary vibration amplitude FB value and a primary vibration phase FB value output from the FET section 540, and it calculates and outputs a primary vibration command value and primary phase command value of the vibration to be excited. Reference symbol 580 denotes a sine wave transmitter to which is input the primary vibration command value and the primary phase command value output from the primary frequency calculation section 570, and a vibration frequency value output from the frequency detection section 530, and that outputs a primary current command value. Reference symbol 590 denotes a secondary frequency calculation section to which is inputs a secondary vibration command value read from the secondary command ROM 560, and a secondary vibration amplitude FB value and a secondary vibration phase FB value output from the FET section 540, and it calculates and outputs a secondary vibration command value and secondary phase command value of the vibration to be excited. Reference symbol 600 denotes a sine wave transmitter to which is input the secondary vibration command value and the secondary phase command value output from the secondary frequency calculation section 590, and a vibration frequency value output from the frequency detection section 530, and that outputs a secondary current command value. Reference symbol 610 denotes a zero command output section that outputs a zero current command value. Reference symbol 53 denotes a current amplifier that outputs a motor current that flows though the linear actuator 31, based on a superimposed current command value in which the zero current command value, the primary current command value, and the secondary current command value are superimposed.

Next, with reference to FIG. 10, there is described an operation for suppressing only vibrations that should be suppressed among the vibrations that occur in the automobile body frame 41, while generating vibrations to be applied superimposably. In an automobile equipped with a six-cylinder engine, when a cylinder stop control from six cylinders to three cylinders is performed, the primary frequency calculation section 570 calculates and outputs a command value for suppressing vibrations that newly occur because of the switch to three cylinder driving (vibrations that occur in three cylinder driving operation). On the other hand, the secondary frequency calculation section 590 calculates and outputs a command value for newly generating vibrations that have stopped occurring due to the switch to the three cylinder driving operation (vibrations generated in six cylinder driving operation). When a superimposed current command value, in which the command value for suppressing vibrations that occur in the three cylinder driving operation and the command value for newly generating vibrations to be generated in the six cylinder driving operation are superimposed, is output to the current amplifier 53, the auxiliary mass 32 vibrates in the linear actuator 31 so as to suppress unwanted vibrations, and to generate vibrations to be newly generated. As a result, even if a cylinder stop control is performed from six cylinders to three cylinders, vibrations of the six cylinder driving operation continue to be generated, so that there is no discomfort to the driver.

Fourth Embodiment

Figure 11:
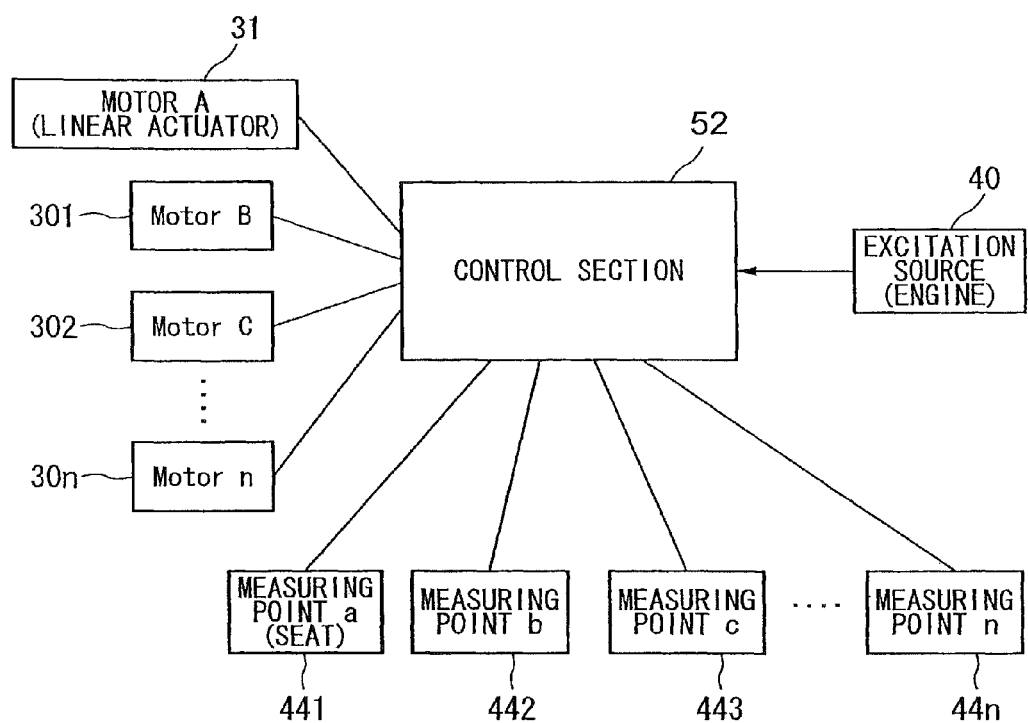
FIG. 11 is a block diagram showing a configuration of a fourth embodiment of the present invention.

Next, with reference to FIG. 11, a fourth embodiment is described. The damping apparatus shown in FIG. 11 differs from the damping apparatus shown in FIG. 10 in that there is provided a plurality of measuring points for detecting vibrations, and there is provided a plurality of linear actuators for performing excitation. A control section 52, at measuring points 441, 442, 443, and 44n, finds command values for the vibrations to be suppressed and for the vibrations to be generated, and outputs these to the respective linear actuators 31, 301, 302, and 30n. Thus, vibrations that need to be suppressed can be reduced and vibrations that need to be emphasized can be increased. Therefore, for example, it becomes possible to perform a control such that engine vibrations are suppressed while increasing bass sound vibrations generated from audio speakers when playing music, based on audio signals of music being played. Moreover, by suppressing engine vibrations, it becomes possible to reduce muffleness of sound within the interior of the automobile.

Thus, in order to suppress unwanted vibrations while generating predetermined vibrations as necessary, in the damping apparatus including a means for exciting the automobile body frame 41 by vibrating the auxiliary mass 32 supported by the linear actuator 31, the frequency of the engine 40 that vibrates the automobile body frame 41 and the vibrations at the seat 44 are detected, and command values for vibrations to be suppressed and for vibrations to be generated are found based on the frequency of the engine 40 and the vibrations at the seat 44, and a control signal in which these command values are superimposed, is output to the linear actuator 31. As a result, it is possible to suppress unwanted vibrations and to generate predetermined vibrations as necessary, and to prevent discomfort due to the vibration control from being given to the driver.

Fifth Embodiment

Figure 12:
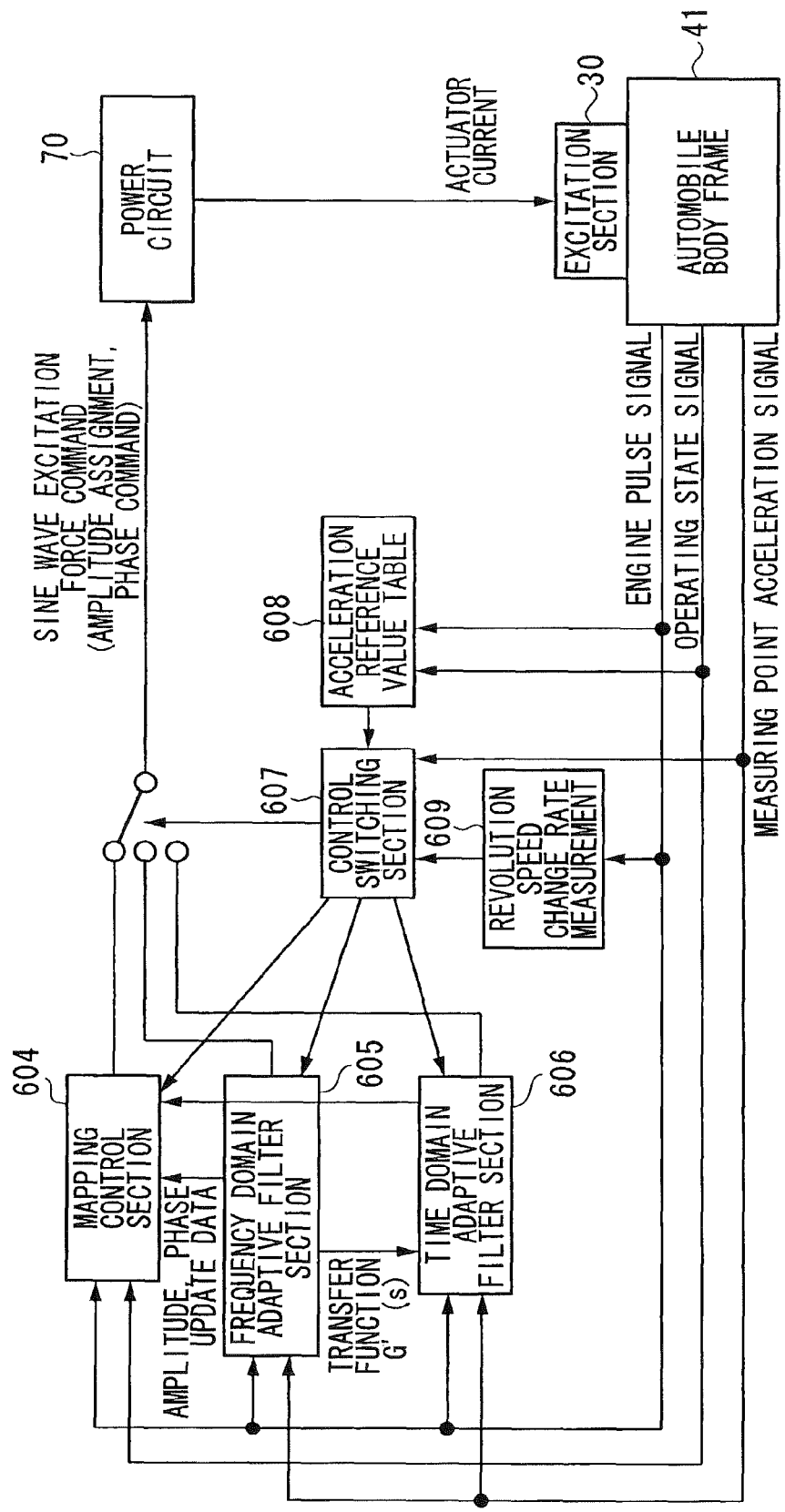
FIG. 12 is a block diagram showing a configuration of a fifth embodiment of the present invention.

Next, a configuration of a damping apparatus according to a fifth embodiment of the present invention is described, with reference to the drawing. FIG. 12 is a block diagram showing a configuration of the same embodiment. In this diagram, reference symbol 41 denotes an automobile body frame on which an engine such as internal combustion engine is mounted, and a vibrating system of the automobile body is formed due to rotation drive of the engine. Reference symbol 30 denotes an excitation section 30 that vibrates an auxiliary mass with a linear actuator to thereby damp vibrations generated in the body of the automobile body frame 41. For this excitation section 30, it is possible to use a linear actuator such as voice coil motor or a reciprocating motor. Reference symbol 70 denotes a power circuit that drives the excitation section 30. Reference symbol 604 denotes a mapping control section that makes reference to internal mapping data and performs damping control. Reference symbol 605 denotes a frequency domain adaptive filter section that performs damping control with a frequency domain adaptive filter. Reference symbol 606 denotes a time domain adaptive filter section that performs damping control with a time domain adaptive filter.

The frequency domain adaptive filter section 605 and the time domain adaptive filter section 606 update map data held in the mapping control section 604, based on results from the adaptive filters. Reference symbol 607 denotes a control switching section that selects any one of the mapping control section 604, the frequency domain adaptive filter section 605, and the time domain adaptive filter section 606 to perform damping control, and it switches controls to be used based on, an acceleration at a measuring point in a predetermined position of the automobile body frame 41, an acceleration reference value, and a change rate of engine revolution speed. Moreover, the frequency domain adaptive filter section 605 transfers a transfer function G' (s) to the time domain adaptive filter section 606 and updates it. The inverse number of (S(n)−S(n−1)/(M(n)−M(n−1))) calculated in the frequency domain adaptive filter section 605 corresponds to G'(s). Reference symbol 608 denotes an acceleration reference value table in which acceleration reference values corresponding to revolution speed are stored for each of the operating states. Reference symbol 609 denotes a revolution speed change rate measuring section that measures the change rate in engine revolution speed based on engine pulse signals, and calculates engine revolution speed N and revolution speed change rate dN/dt and updates them for each engine pulse signal, based on the time intervals of engine pulse signals being generated. The automobile body frame 41 includes an acceleration sensor that detects an acceleration A at the measuring point and outputs a measuring point acceleration signal, and a function (not shown in the drawing) for outputting an operating state signal D0 that shows an operating state at the present moment (gear position, air conditioner ON/OFF, accelerator opening, and so forth).

Figure 14:
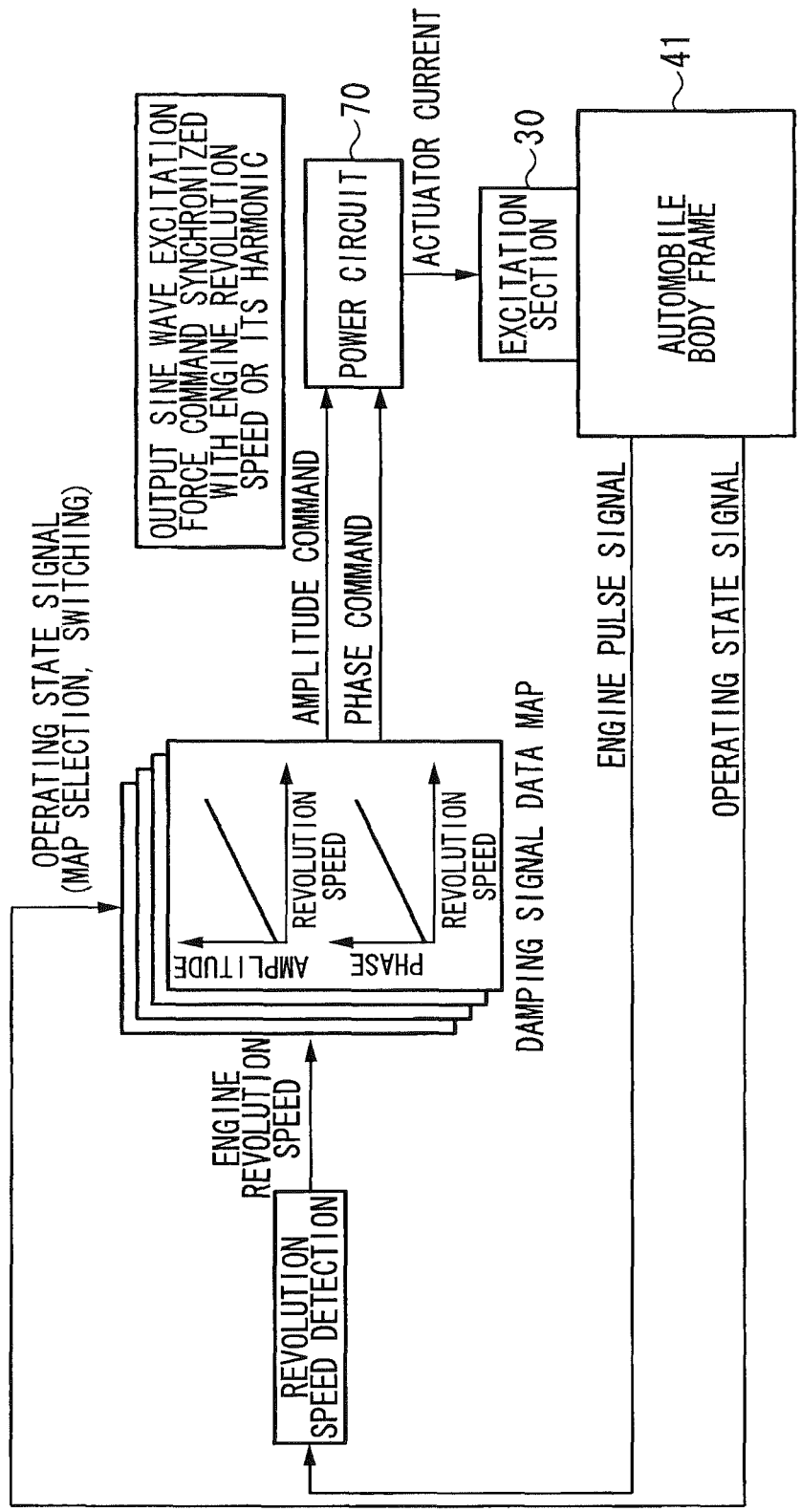
FIG. 14 is a diagram showing a configuration of the mapping control section 604 shown in FIG. 12.
Figure 15:
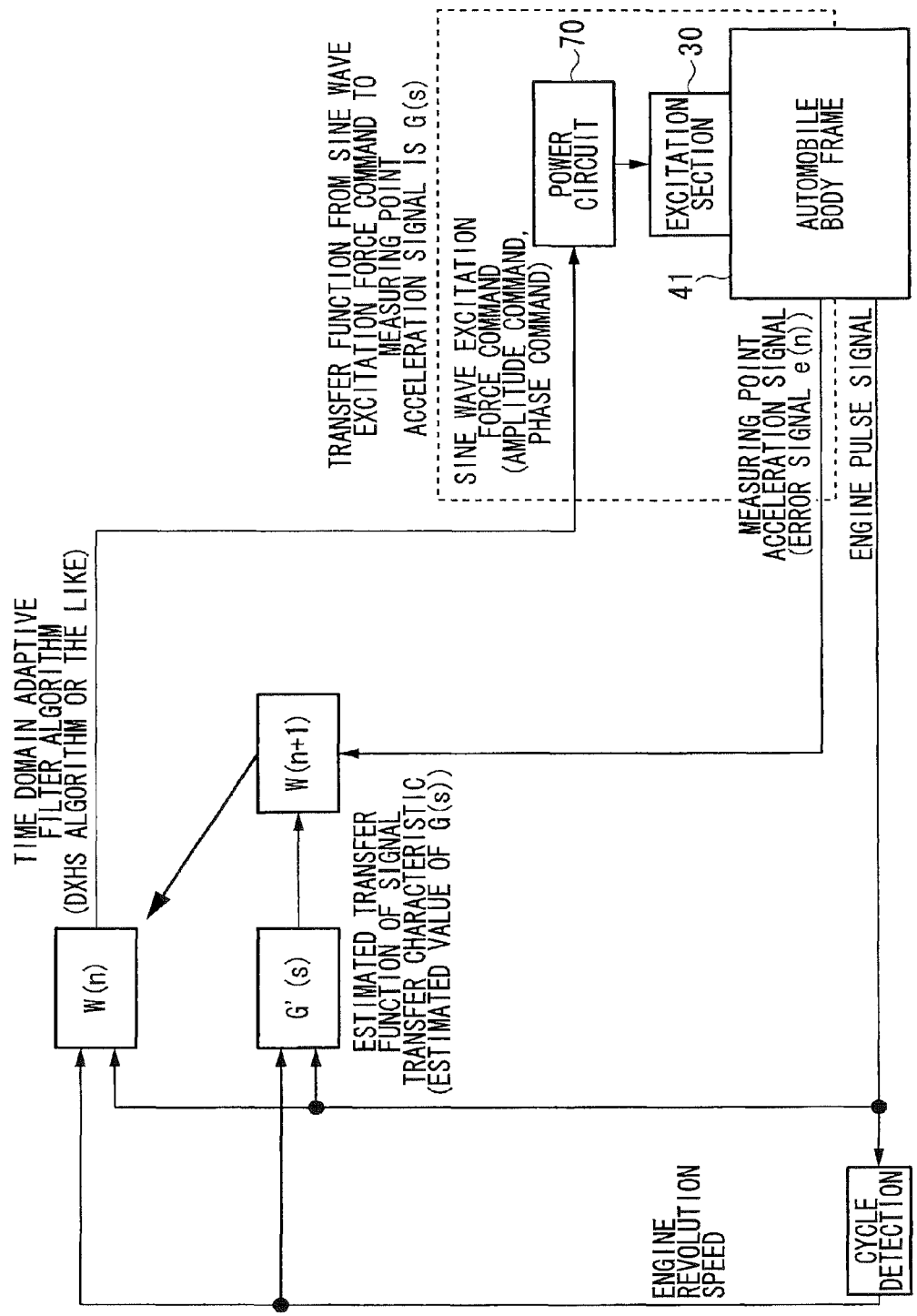
FIG. 15 is a diagram showing a configuration of the frequency domain adaptive filter 605 shown in FIG. 12.
Figure 16:
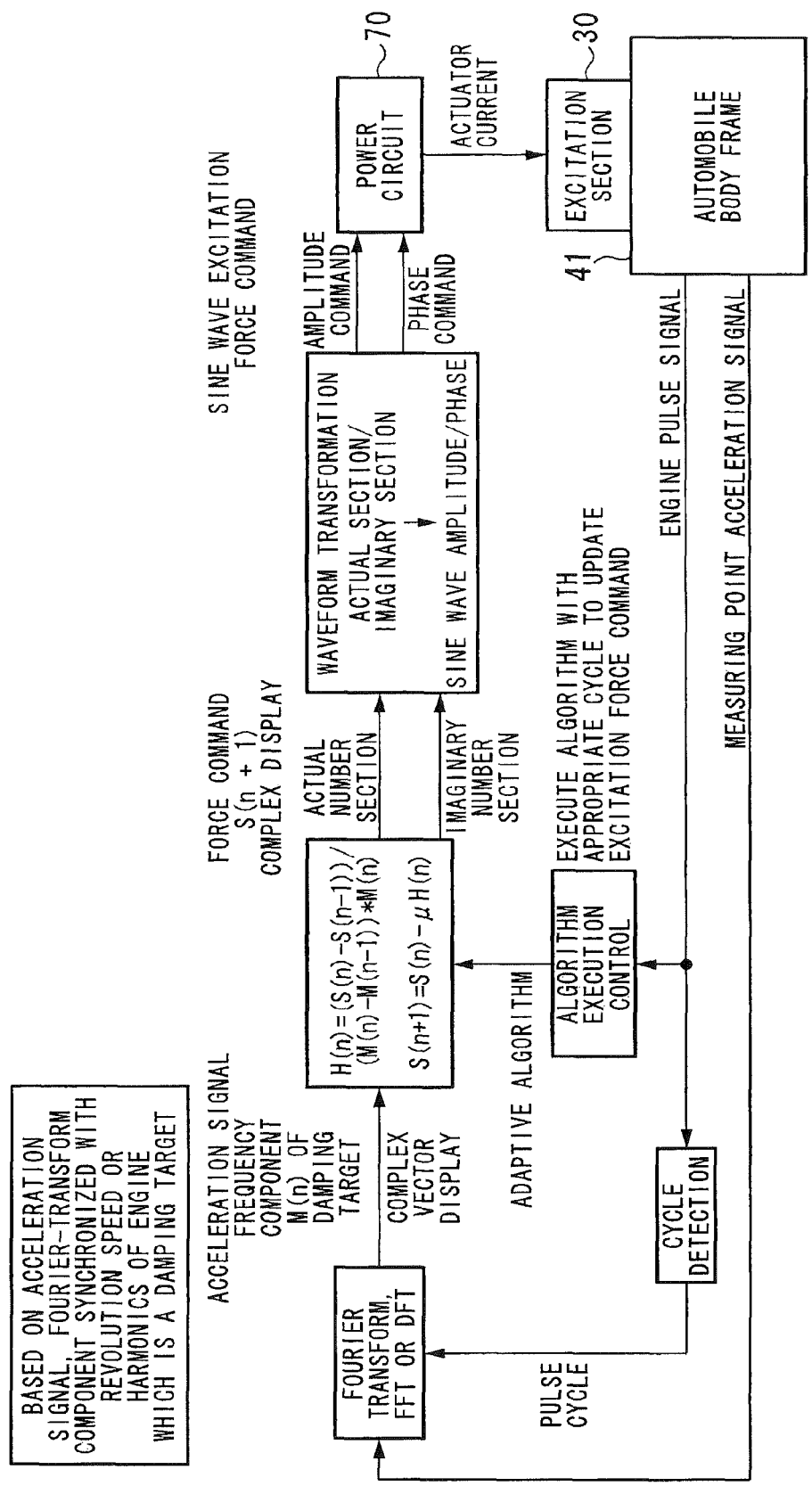
FIG. 16 is a diagram showing a configuration of the time domain adaptive filter 606 shown in FIG. 12.

Here, with reference to FIG. 14 to FIG. 16, an operation of each control section is described. Control operations shown in FIG. 14 to FIG. 16 are essentially controls according to conventional techniques, and the detailed descriptions thereof are therefore omitted.

FIG. 14 is a diagram showing an operation of the mapping control section 604 shown in FIG. 12. The mapping control section 604 selects a control signal data map based on an operating state signal and an engine revolution speed found from the engine pulse signals, reads an amplitude command value and phase command value predefined in this data map, and outputs this read amplitude command value and phase command value to the power circuit 70. The power circuit 70, based on these command values, controls vibrations of the excitation section to thereby reduce vibrations of a damping target (automobile body).

FIG. 15 is a diagram showing an operation of the time domain adaptive filter section 606 shown in FIG. 12. The time domain adaptive filter section 606 receives the input of the measuring point acceleration signal and the engine pulse signal, finds sine wave exciting force command values (amplitude command value and phase command value) based on the estimated transfer function G (s) of the signal transfer characteristic, and outputs these sine wave exciting force command value to the power circuit 70. The power circuit 70, based on these command values, controls vibrations of the excitation section to thereby reduce vibrations of a damping target (automobile body).

FIG. 16 is a diagram showing an operation of the frequency domain adaptive filter section 605 shown in FIG. 12. The frequency domain adaptive filter section 605 receives the input of a measuring point acceleration signal and engine pulse signal, finds a force command value of the force to be generated based on the frequency component of the damping target obtained with use of Fourier transform, finds sine wave exciting force command values (amplitude command value and phase command value) obtained based on this force command, and outputs these sine wave exciting force command values to the power circuit 70. The power circuit 70, based on these command values, controls vibrations of the excitation section to thereby reduce vibrations of a damping target (automobile body).

Next, an operation of the damping apparatus shown in FIG. 12 is described. First, when the engine of an automobile is started, the control switching section 607 selects the mapping control section 604. Thus, mapping control is performed. In this state, the control switching section 607 compares an acceleration signal at the measuring point on the automobile body frame 41 with an acceleration reference value stored in the acceleration reference value table 608, and if the detected acceleration exceeds the acceleration reference value, it performs switching from the mapping control to an adaptive filter. In the case where switching is made from the mapping control to the adaptive filter, the control switching section 607 makes reference to the output of the revolution speed change rate measuring section 609, and it switches to the time domain adaptive filter section 606 if the change rate is significant and switches to the frequency domain adaptive filter section 605 if the change rate is small. Moreover, when the frequency domain adaptive filter section 605 is being operated, during the course of an adaptive filter calculation, the estimated transfer function of the signal transfer characteristic ((S(n)−S(n−1))/(M(n)−M(n−1))) that is essential in the time domain adaptive filter section 606 is found. This estimated transfer function corresponds to 1/G' (s), and therefore the estimated transfer function G' (s) of the time domain adaptive filter 6 is updated based on this result.

Having shifted to the adaptive filter, the control switching section 607 performs switching from the adaptive filter back to the mapping control at the point in time when acceleration is below the acceleration reference value. At this time, in the frequency domain adaptive filter section 605 or the time domain adaptive filter section 606, sine wave exciting force commands that enable effective damping are found by means of the operation of the adaptive filter. Therefore the frequency domain adaptive filter section 605 or the time domain adaptive filter section 606, based on the found excitation force command value, updates the mapping data held in the mapping control section 604. With this operation, the mapping data is updated to the optimum mapping data at the present moment. Therefore, it is possible to prevent the damping performance from being degraded due to the influence of individual differences or age related changes, while maintaining appropriate execution of the damping control process.

Figure 13:
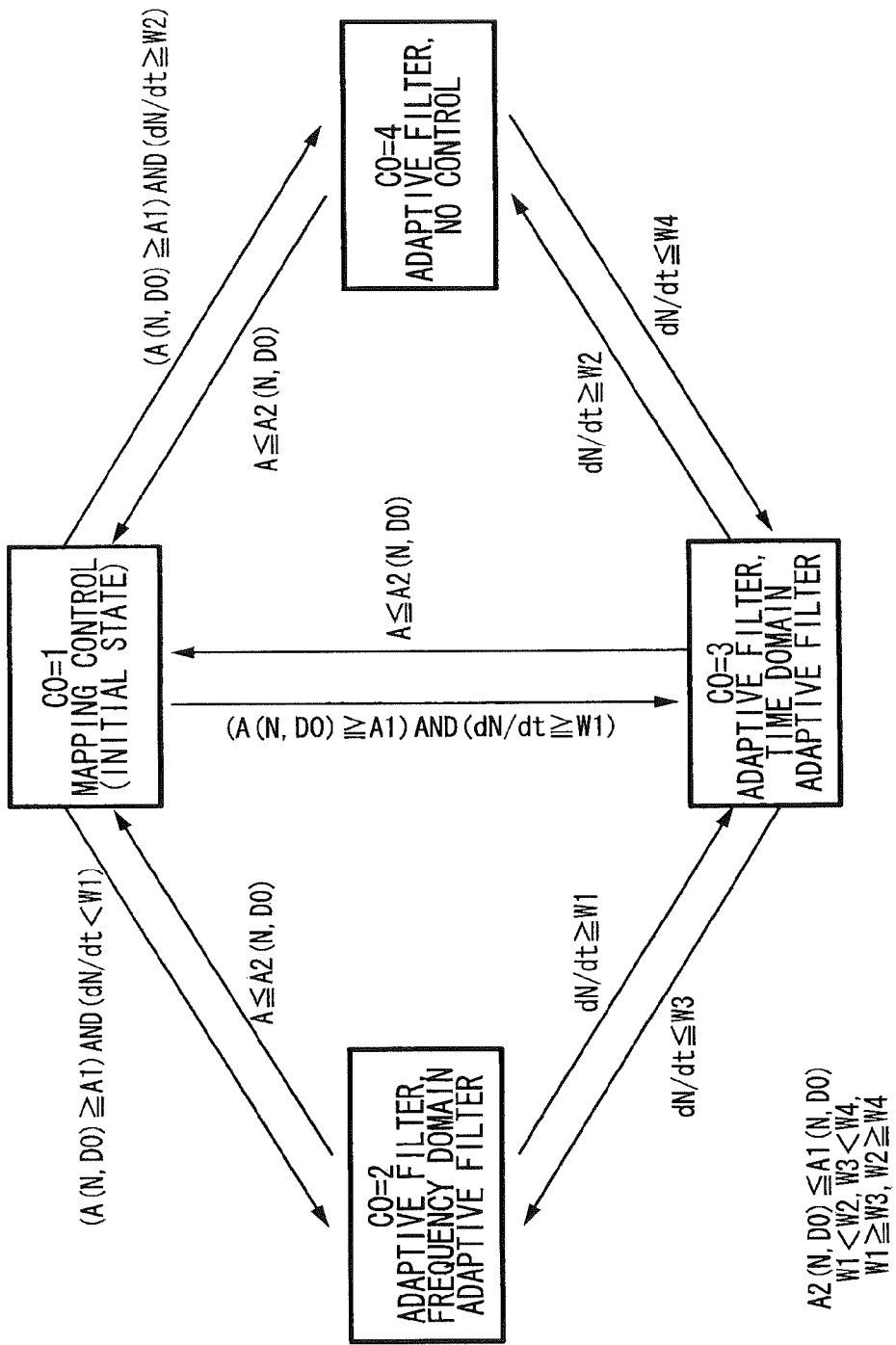
FIG. 13 is a state transition diagram showing operations of the control switching section 607 shown in FIG. 12.

Next, with reference to FIG. 13, timings at which the control switching section 607 switches the respective controls are described. FIG. 13 is a diagram showing operations for switching control types based on state values. In FIG. 13, based on the engine revolution speed N and the operating state value D0, the reference values obtained upon reference to the acceleration reference value table 608 are shown as A1 (N, D0) or A2 (N, D0). A1 (N, D0) is a reference value for shifting from the mapping control to the adaptive filter, and A2 (N, D0) is a reference value for shifting from the adaptive filter to the mapping control, where a relationship A2 (N, D0)≤A1 (N, D0) is satisfied. Moreover, reference values for performing shifting between adaptive filter types are shown as W1 to W4. W1 is a reference value for shifting from the frequency domain adaptive filter to the time domain adaptive filter, based on engine revolution speed change rate dN/dt. W2 is a reference value for shifting from the time domain adaptive filter to no control, based on engine revolution speed change rate dN/dt. W3 is a reference value for shifting from the time domain adaptive filter to the frequency domain adaptive filter, based on engine revolution speed change rate dN/dt. W4 is a reference value for shifting from no control to the time domain adaptive filter, based on engine revolution speed change rate dN/dt. Reference values W1 to W4 satisfy relationships W1<W2, W3<W4, W1≥W3, and W2≥W4. Moreover, the mapping control state (initial state) is shown as C0=1, the control state with the frequency domain adaptive filter is shown as C0=2, the control state with the time domain adaptive filter is shown as C0=3, and the state without adaptive filter control is shown as C0=4. As shown in FIG. 13, by selecting and executing a control type optimum at the present moment based on the reference values A1, A2 found from the engine revolution speed N and the revolution speed change rate dN/dt and the reference values W1 to W4 for adaptive filter switching, an optimum damping control becomes possible.

Reference values A1 and A2 may be the same value. However, these values may be set such that A2<A1 is satisfied, and after the acceleration reference value has been exceeded and a shift to adaptive filter control has been made, a hysteresis is provided when returning to the mapping control, so that the control returns to the mapping control if acceleration is below the acceleration reference value by the hysteresis width. Thus, the damping performance can be further improved, and the mapping data can be updated to have higher quality. Moreover, when returning to the mapping control, the control may return to the mapping control in the case where acceleration is below the acceleration reference value while revolution speed change rate is above the predetermined value. Thus, the control stays in the adaptive filter control as long as possible, and the mapping data can be updated while the damping performance is enhanced.

Moreover, when updating the mapping data, only the engine revolution speed data for when the control has shifted from the mapping control to the adaptive filter control may be updated, and all of the revolution speed data while acceleration is below the acceleration reference value during the performance of the adaptive filter control may be updated. Furthermore, the timing of updating the mapping data is such that the mapping data is updated when the control returns to the mapping control, and in addition, the mapping data may be updated every time acceleration is below the acceleration reference value by a predetermined value while performing the adaptive filter control. Moreover, the timing of updating the transfer function is such that the transfer function is updated at constant time intervals, and in addition, it may be updated every time the revolution speed becomes a revolution speed away from a previously updated revolution speed by a predetermined interval. Moreover, in the case where the revolution speed change rate during the performance of the adaptive filter control is too significant, the operation of the adaptive filter may be stopped (no control) in order to avoid its adverse influence.

As described above, in the case where the damping performance with the mapping control is degraded due to individual differences and age related changes, the control is switched to the adaptive filter to thereby improve the damping performance and update the mapping data of the mapping control. Therefore, it is possible to recover the damping performance with the mapping control. Moreover, when performing the adaptive filter, it is switched to any one of the frequency domain, time domain, and no control, according to the revolution speed change rate and response. Therefore, when the revolution speed changes, it is possible to prevent vibrations from being made adversely significant by the adaptive filter. Furthermore, since the transfer function required in the time domain adaptive filter is updated with the calculation process of the frequency domain adaptive filter, it is possible to prevent the characteristic of the time domain adaptive filter from being degraded due to the changes in the transfer function.

Sixth Embodiment

Figure 17:
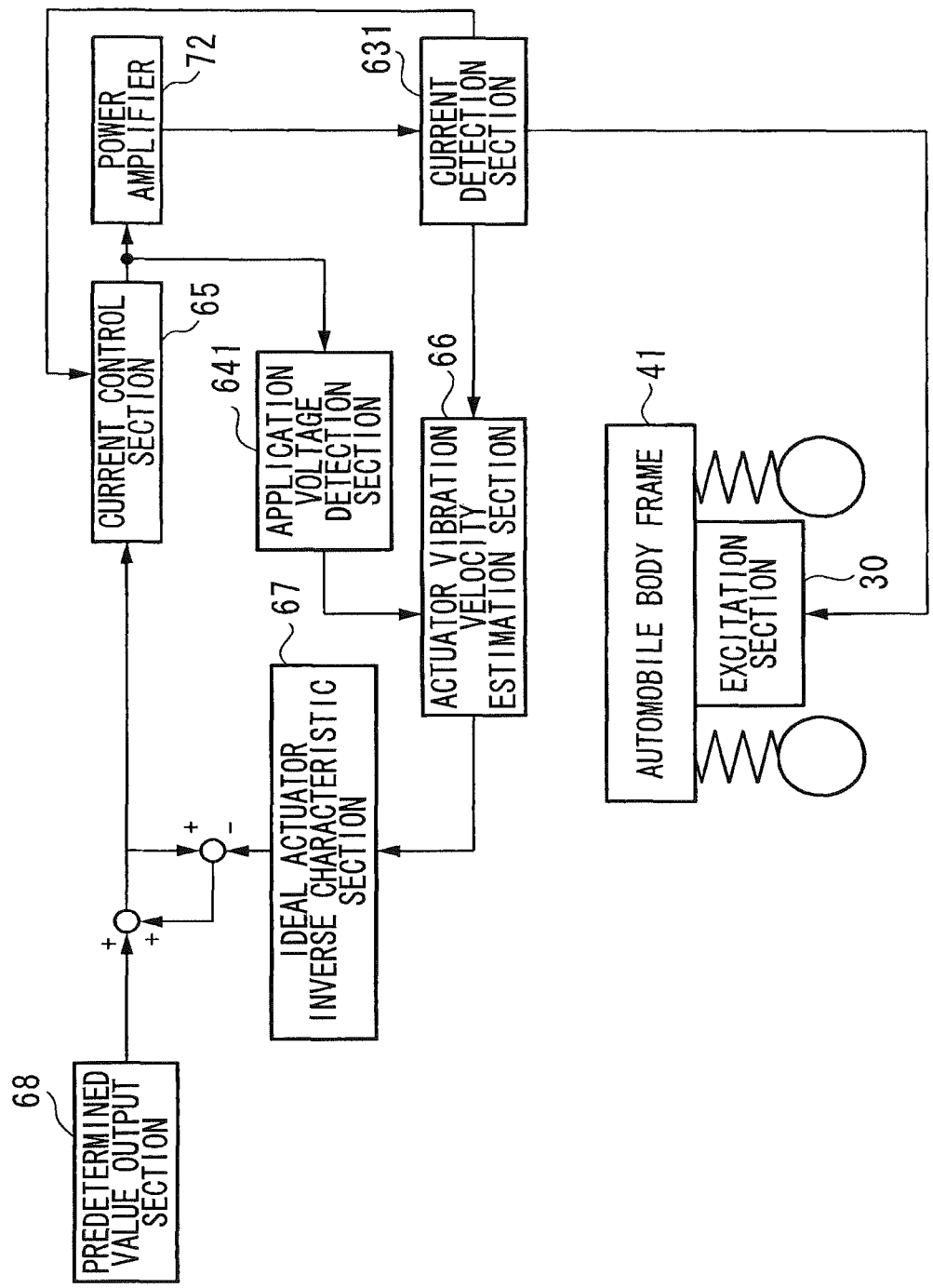
FIG. 17 is a block diagram showing a configuration of an automobile damping apparatus according to a sixth embodiment of the present invention.

Next, a damping apparatus according to a sixth embodiment of the present invention is described, with reference to the drawing. FIG. 17 is a block diagram showing a configuration of the damping apparatus according to the same embodiment. In FIG. 17, reference symbol 30 denotes an excitation section that vibrates an auxiliary mass (weight) and uses the reaction force thereof to thereby suppress vibrations of a damping target device such as an automobile. Reference symbol 41 denotes an automobile body frame to which the excitation section 30 is attached. The excitation section 30 controls (damps) vibrations in the vertical direction (gravitational direction) that occur in the automobile body frame (main system mass) 41. Reference symbol 72 denotes a power amplifier that supplies current for driving a linear actuator provided within the excitation section 30. Reference symbol 65 denotes a current control section that controls current to be supplied to the linear actuator, according to the force to be generated in the excitation section 30. Reference symbol 631 denotes a current detection section that detects current being supplied to the excitation section 30. Reference symbol 641 denotes an application voltage detection section that detects voltage being supplied to the power amplifier 72. Reference symbol 66 denotes an actuator vibration velocity estimation section that, based on the output (current value and voltage value) from the current detection section 631 and the application voltage detection section 641, estimates the vibration velocity of the linear actuator provided within the excitation section 30. Reference symbol 67 denotes an ideal actuator inverse characteristic section that receives the input of a vibration velocity value output from the actuator vibration velocity estimation section 66 and outputs a force command signal that an ideal actuator should output based on the ideal actuator inverse characteristic. Reference symbol 68 denotes a predetermined value output section that outputs a force command value of a predetermined value.

Figure 19:
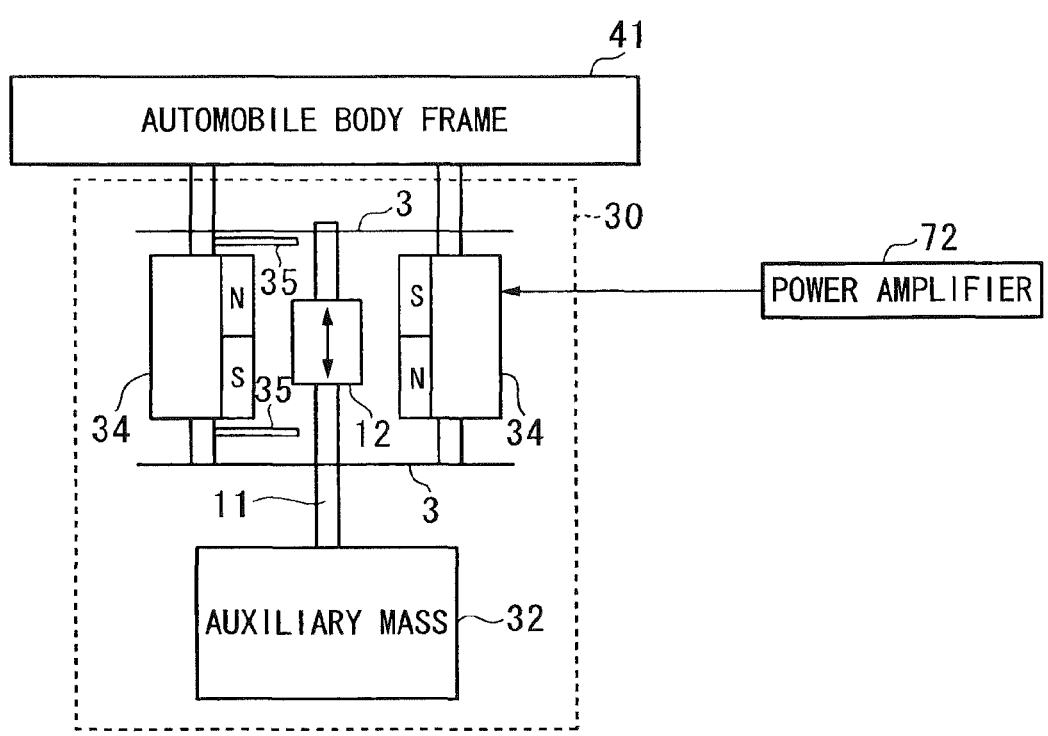
FIG. 19 is a schematic diagram showing a configuration of the excitation section 30 shown in FIG. 17 and FIG. 18.

Here, with reference to FIG. 19, the detailed configuration of the excitation section 30 shown in FIG. 17 is described. FIG. 19 is a diagram showing the detailed configuration of the excitation section 30 shown in FIG. 17. In this diagram, reference symbol 32 denotes an auxiliary mass (weight) to be attached to the automobile body frame 41. Reference symbol 34 denotes stators that constitute a linear actuator (reciprocating motor), and these stators 34 are fixed to the automobile body frame 41. Reference symbol 12 denotes a movable element that constitutes the linear actuator (reciprocating motor), and this movable element reciprocates, for example, in the gravitational direction (in the vertical direction in FIG. 3). The excitation section 30 is fixed on the automobile body frame 41 so that the direction of the vibrations of the automobile body frame 41 to be suppressed matches the direction of the reciprocation (thrust direction) of the movable element 12. Reference symbol 3 denotes a plate spring that supports the movable element 12 and the auxiliary mass 32 while allowing them to move along the thrust direction. Reference symbol 11 denotes a shaft that joins the movable element 12 to the auxiliary mass 32, and is supported by the plate spring 3. Reference symbol 35 denotes stoppers that limit the movable range of the movable element 12, and limit the movable range on both ends of the movable element 12 (upper limit and lower limit in FIG. 19). This excitation section 30 constitutes a dynamic vibration absorber.

Next, an operation of the excitation section 30 shown in FIG. 19 is described. In the case where an alternating current (sinusoidal current, square-wave current) is applied to a coil (not shown in the drawing) that constitutes the linear actuator (reciprocating motor), in a state where a current in a predetermined direction flows through the coil, magnetic flux is, in the permanent magnet, guided from the south pole to the north pole, forming a magnetic flux loop. As a result, the movable element 12 moves in the direction opposite to that of gravity (upward direction). On the other hand, if a current in the direction opposite to that of the predetermined direction flows through the coil, then the movable element 12 moves in the gravitational direction (downward direction). The direction of the current flow into the coils is alternately changed by the alternating current, and the movable element 12 thereby repeats the above operation and reciprocates in the axial direction of the shaft 11 with respect to the stator 34. Thus, the auxiliary mass 32 joined to the shaft 11 vibrates in the vertical direction. By controlling the acceleration of the auxiliary mass 32 based on control signals output from the current control section 65, the control force is adjusted and vibrations of the automobile body frame 41 can be reduced.

Next, an operation of the damping apparatus shown in FIG. 17 is described, with reference to FIG. 17. First, the current detection section 631 detects the current supplied to the excitation section 30, and supplies this to the current control section 65 and the actuator vibration velocity estimation section 66. Moreover, the application voltage detection section 641 detects the voltage applied to the excitation section 30, and supplies this to the actuator vibration velocity estimation section 66. In the case where the linear actuator in the excitation section 30 is driven, the linear actuator generates an induced electromotive force proportional to velocity. By calculating this induced electromotive force, the actuator vibration velocity estimation section 66 can obtain a vibration velocity signal.

For example, an application voltage V and a current i are detected, and are output as induced voltage E through an amplifying circuit and differentiating circuit. In this case, gains K1 and K2 corresponding to a wire wound resistance R and a wire wound inductance L need to be set. This setting is adjusted by applying a current of a predetermined frequency while the movable section of the linear actuator (movable element, auxiliary mass) is in a state of being restrained so that the output becomes zero. Since the relationship $E=V-R \cdot i - L(di/dt)$ holds for the induced voltage E, it is possible to find the induced voltage E by detecting the terminal voltage V and the current i. Moreover, in the case where a spring constant close to an optimum value in the excitation section 30 can be obtained by means of the magnetic spring characteristic or mechanical spring element, then by adjusting the damping force that the linear actuator generates, a high level of damping effect can be achieved without supplying energy for damping. The damping force can be adjusted by connecting a load resistance to both ends of the coil of a linear actuator 11A and by changing the level of this load resistance.

The actual actuator output for a command value at the present moment is reflected on the output from the actuator vibration velocity estimation section 66. On the assumption that the linear actuator is an ideal actuator, the current control section 65 receives the input of a command signal of a force required when the ideal actuator outputs a vibration velocity estimated by the actuator vibration velocity estimation section 66. Therefore, the ideal actuator inverse characteristic section 67 outputs a command signal of a force required when the ideal actuator outputs the vibration velocity estimated by the actuator vibration velocity estimation section 66. Expression (1) shows an example of the transfer function of the ideal actuator inverse characteristic.

$$Gi(s)=(Mis^2+Cis+Ki)/s \qquad (1)$$

where Mi: auxiliary mass (ideal value), Ci: damping coefficient (ideal value), Ki: spring constant (ideal value), and the damping coefficient of the transfer function falls within a range of 1/100 to 100 times a critical damping (damping attenuation factor=1).

The difference value between the actual command signal and the output of the ideal actuator inverse characteristic section 67 is fed back as a correction value of the command signal, and thereby the actual actuator can behave as the ideal actuator. The current control section 65, based on the current detected by the current detection section 631 and the command signal output from the ideal actuator inverse characteristic section 67, derives an optimum driving amount (control amount) of the linear actuator so that the optimum spring characteristic and damping characteristic for the excitation section 30 to damp the vibration of the automobile body frame 41 can be obtained, and outputs the derived result as a command signal to the power amplifier 72. The power amplifier 72, according to the command signal of the current control section 65, drives the excitation section 30 so that the auxiliary mass 32 vibrates in the vertical (gravitational) direction. With the reaction force caused by the vibration of this auxiliary mass 32, the vibrations occurring in the automobile body frame 41 are suppressed.

There may be provided a band-pass filter that limits the ideal actuator inverse characteristic to a band in the vicinity of a resonance frequency of the actuator.

Thus, by making the ideal actuator characteristic equal to that of an optimum dynamic vibration absorber, it becomes possible for an active dynamic vibration absorber to behave as the optimum dynamic vibration absorber. Therefore, in the damping apparatus for an automobile, it is possible to suppress resonance phenomenon to thereby to have the vibration amplitude of the auxiliary mass within an appropriate range, and to realize ideal vibration suppression. As a result, the vibration suppression performance can be improved.

Figure 18:
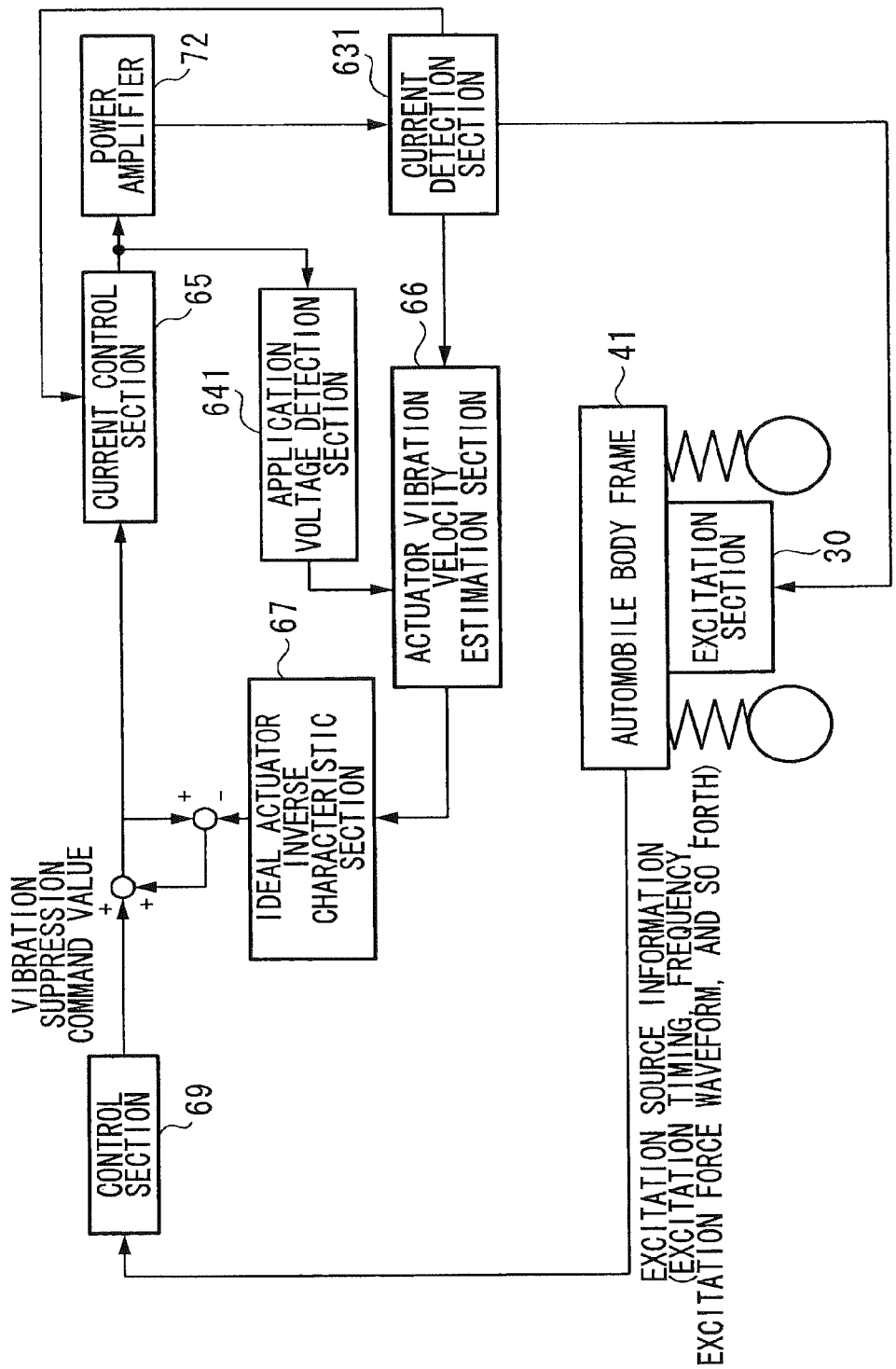
FIG. 18 is a diagram showing a configuration of a modified example of the automobile damping apparatus shown in FIG. 17.

Next, a modified example of the damping apparatus shown in FIG. 17 is described, with reference to FIG. 18. FIG. 18 is a block diagram showing a configuration of a modified example of the damping apparatus shown in FIG. 17. In this diagram, the same reference symbols are given to components the same as those of the apparatus shown in FIG. 17, and descriptions thereof are omitted. The apparatus shown in FIG. 18 differs from the apparatus shown in FIG. 17 in that, instead of the predetermined value output section 68, there is provided a control section 69 that acquires excitation source information (excitation timing, frequency, excitation force waveform, automobile body vibration, and so forth) and that outputs a command value for suppressing vibrations based on this excitation source information. A vibration suppression command value output by the control section 69 is generated from the excitation force of the excitation source or frequency information of the excitation force, and the vibration information or excitation force information of an automobile body (damping target device) 2, and output. The excitation section 30, based on this vibration suppression command value, drives the linear actuator. Other operations are similar to the operations described above, and the detailed descriptions thereof are therefore omitted.

The damping apparatus for an automobile according to the present invention is effective if attached to the body frame of the automobile, to in the vicinity of the engine mount or radiator, or to under part of a rear luggage carrying section or trunk. By providing the low pass filters, the high frequency noise component can be removed, and therefore generation of an abnormal noise caused by the noise component can be suppressed.

Moreover, the linear actuator provided within the excitation section 30 is an actuator that uses electromagnetic force, and is effective if it uses a reciprocating motor for example. Furthermore, the actuator provided within the excitation section 30 may be a piezoelectric actuator that uses an element that causes displacement by applying a voltage thereto.

As described above, since there is provided a resonance suppression means of the actuator based on the ideal actuator inverse characteristic that uses the transfer function of the relative vibration velocity with respect to the excitation force of the vibrating system of the actuator, it is possible to adjust the actuator characteristic to an arbitrary characteristic by setting the ideal actuator inverse characteristic based on a desired characteristic. As a result, by increasing the damping characteristic of the desired characteristic, it is possible to attain a characteristic such that resonance in the movable section of the actuator is unlikely to be generated by an external force that acts on the actuator main unit. Therefore, it is possible to realize ideal vibration suppression by generating an appropriate reaction force. Moreover, since it is possible to reduce the apparent natural frequency of the actuator by reducing the natural frequency of the desired characteristic, then even in the vicinity of the natural frequency of the actual actuator, it is possible to realize stable vibration control without receiving the influence of the spring characteristic and the like.

Seventh Embodiment

Figure 20:
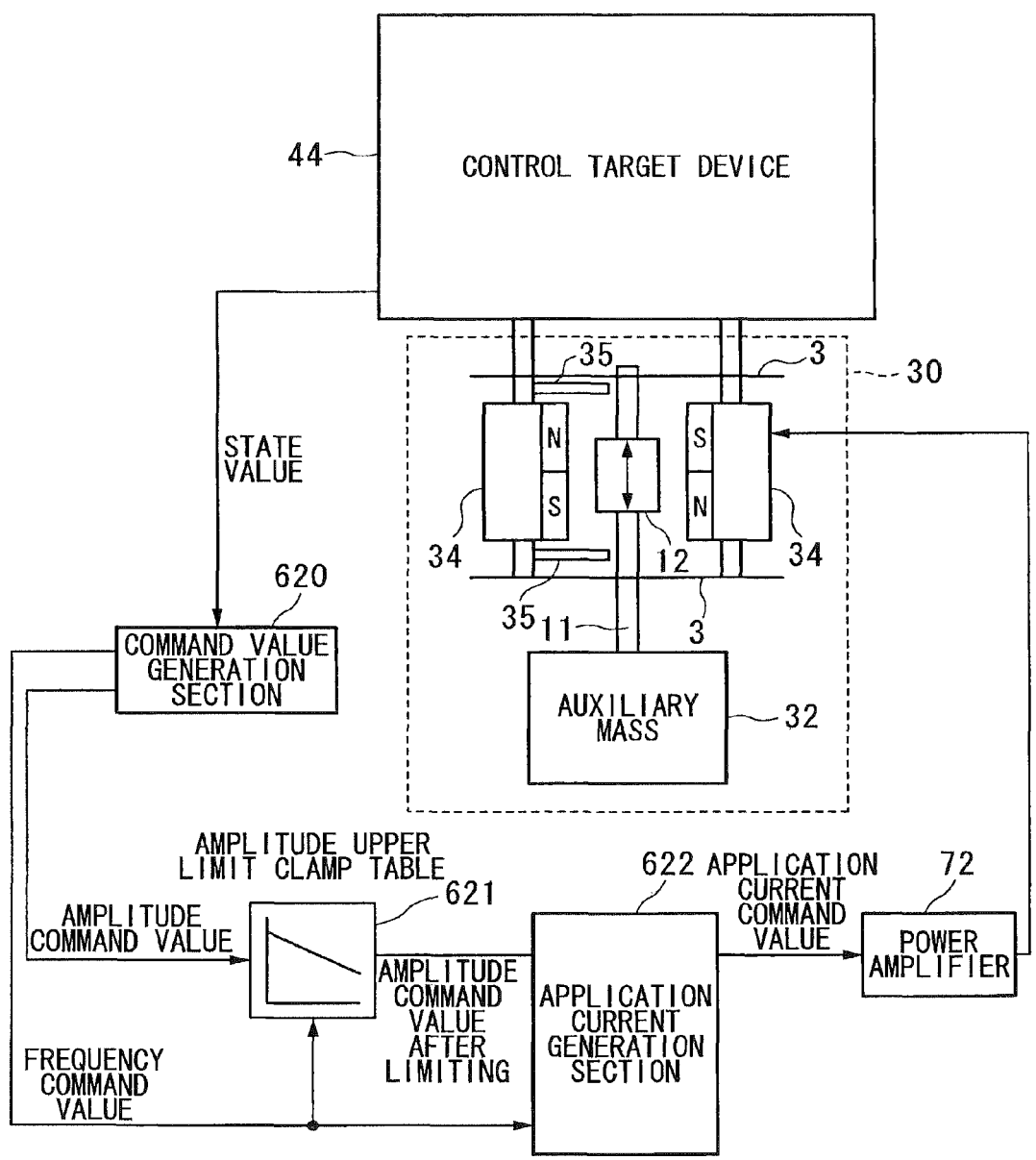
FIG. 20 is a block diagram showing a configuration of a seventh embodiment of the present invention.

Next, a damping apparatus according to a seventh embodiment of the present invention is described, with reference to the drawing. FIG. 20 is a block diagram showing a configuration of the same embodiment. In this diagram, reference symbol 30 denotes an excitation section that is fixed on a control target device 44, which is the target of damping control, and that drives an auxiliary mass member with a linear actuator (reciprocating motor) provided therein to thereby suppress the vibrations of the control target device 44. The control target device 44 here refers to an automobile body for example.

Reference symbol 32 denotes an auxiliary mass (weight) attached to the control target device 44. Reference symbol 34 denotes stators that constitute a reciprocating motor, and these stators 34 are fixed to the control target device 44. Reference symbol 12 denotes a movable element that constitutes the reciprocating motor, and this movable element reciprocates, for example, in the gravitational direction (in the vertical direction in FIG. 1). The excitation section 30 is fixed to the control target device 44 so that the direction of the vibrations of the control target device 44 to be suppressed matches the direction of the reciprocation (thrust direction) of the movable element 12. Reference symbol 3 denotes a plate spring that supports the movable element 12 and the auxiliary mass 32 while allowing them to move along the thrust direction. Reference symbol 11 denotes a shaft that joins the movable element 12 to the auxiliary mass 32, and is supported by the plate spring 3. Reference symbol 35 denotes stoppers that limit the movable range of the movable element 12, and limit the movable range on both ends of the movable element 12 (upper limit and lower limit in FIG. 20).

Reference symbol 620 denotes a command value generation section that receives the input of a state value (for example, engine revolution speed) of the control target device 44, and that calculates and outputs the amplitude command value and frequency command value of the vibrations to be generated for the auxiliary mass 32. Reference symbol 621 denotes an amplitude upper limit clamp table in which there is defined the upper limit of applicable current value for each frequency that is decided upon the amplitude command value and frequency command value output from the command value generation section 620. Reference symbol 622 denotes an application current generation section that receives the input of an amplitude command value and frequency command value, that makes reference to the amplitude upper limit clamp table 621 to perform correction for limiting the inputted amplitude command value within an appropriate movable range, and that, based on the inputted frequency command and the amplitude command value after this correction (limitation) has been performed, finds and outputs a command value of current to be applied to the reciprocating motor. Reference symbol 72 denotes a power amplifier that supplies current to the stator 34 of the reciprocating motor that constitutes the excitation section 30, and that controls reciprocation of the movable element 12.

Next, an operation of the excitation section 30 shown in FIG. 20 is described. In the case where an alternating current (sinusoidal current, square-wave current) is applied to a coil (not shown in the drawing) that constitutes the reciprocating motor, in a state where an current in a predetermined direction flows through the coil, magnetic flux is, in the permanent magnet, guided from the south pole to the north pole, forming a magnetic flux loop. As a result, the movable element 12 moves in the direction opposite to that of gravity (upward direction). On the other hand, if a current in the direction opposite to that of the predetermined direction flows through the coil, then the movable element 12 moves in the gravitational direction (downward direction). The direction of the current flow into the coils is alternately changed by the alternating current, and the movable element 12 thereby repeats the above operation and reciprocates in the axial direction of the shaft 11 with respect to the stator 34. Thus, the auxiliary mass 32 joined to the shaft 11 vibrates in the vertical direction. By controlling the acceleration of the auxiliary mass 32 based on control signals output from the power amplifier 72, the control force is adjusted and vibrations of the control target device 44 can be reduced.

In the linear actuator shown in FIG. 20, rather than slidably and reciprocatably supporting the shaft 11, each of the plate springs 3 supports the movable element 12 in two positions on the upper end side and the lower end side of the shaft 11, and they elastically deforms themselves to thereby support the movable element 12 while allowing it to reciprocate in the axial direction of the shaft 11. As a result, no wear or sliding resistance occurs on the movable element 12. Therefore even after use for a long period of time, the precision of the bearing support does not decrease, and a high level of reliability can be attained. Furthermore, there is no power consumption loss caused by sliding resistance, and an improvement in the performance can be achieved. However, as mentioned above, in the case where changes in behavior of the automobile are significant as a result of sudden acceleration or traveling over rough road surface, changes in the current supplied to the stators 34 also become more significant. As a result, a phenomena where the movable element 12 collides with the stoppers 35 occurs. In the case of attaching the excitation section 30 to an automobile as a damping apparatus, it is preferable that there be no sound of collision (abnormal noise) caused by collisions between the movable element 12 and the stoppers 35.

For this purpose, in the case where for each frequency of current being applied to the stators 34, an upper limit value of current that can be newly applied at the present moment is pre-found, the relationship between this current frequency and the current upper limit value is stored in the amplitude upper limit clamp table 20, while replacing the relationship between them with the relationship between the amplitude command value and the frequency command value, and then the application current generation section 622 finds a new application current command value, this amplitude upper limit clamp table 20 is referenced, the amplitude command value output from the command value generation section 620 is corrected, and based on this corrected amplitude command value and the frequency command value output from the command value generation section 620, a new application current command value is found to be output to the power amplifier 72. Thereby, it is possible to prevent the movable element 12 from colliding with the stoppers 35. Moreover, since amplitude command value correction is performed by making reference to the table, the amount of calculation in the application current generation section 622 can be reduced. Therefore, it is possible to speed up the processing while allowing use of an inexpensive calculation apparatus to achieve a reduction in the cost.

Figure 21:
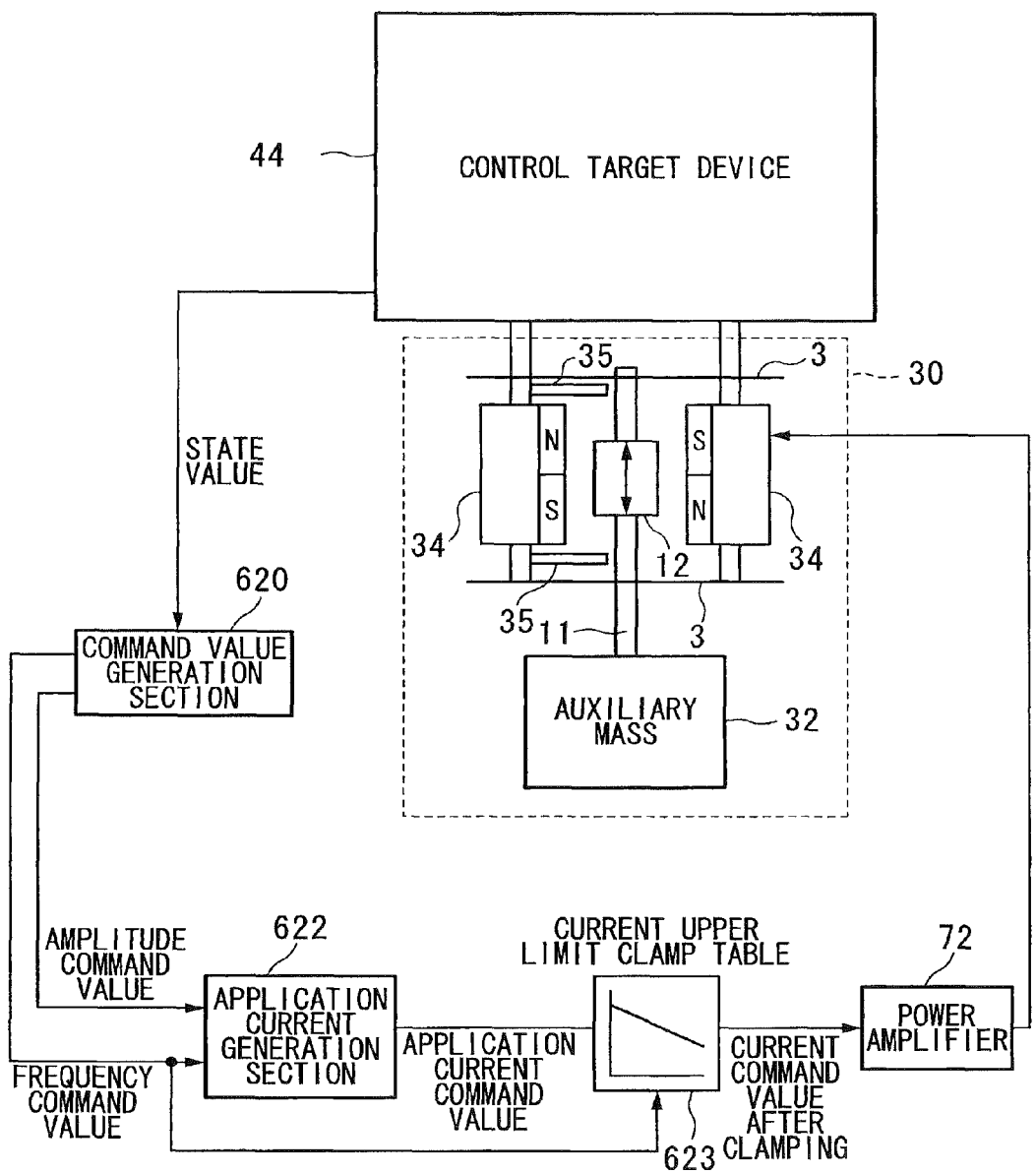
FIG. 21 is a block diagram showing a modified example of the configuration of the seventh embodiment shown in FIG. 20.

Next, a modified example of the damping apparatus shown in FIG. 20 is described, with reference to FIG. 21. In this diagram, the same reference symbols are given to components the same as those of the apparatus shown in FIG. 20, and descriptions thereof are omitted. The apparatus shown in this diagram differs from the apparatus shown in FIG. 20 in that instead of the amplitude upper limit clamp table 621, there is provided a current upper limit clamp table 623. The current upper limit clamp table 623 is a table such that for each frequency of current being applied to the stators 34, an upper limit value of current that can be newly applied at the present moment is pre-found, and the relationship between this current frequency and the current upper limit value is pre-stored, while replacing the relationship between them with the relationship between the application current command value and the frequency command value. In the case where the application current generation section 622 finds a new application current command value, this current upper limit clamp table 623 is referenced, and based on the amplitude command value output from the command value generation section 620 and the frequency command value output from the command value generation section 620, the newly found application current command value is corrected and output to the power amplifier 72. Thereby, it is possible to prevent the movable element 12 from colliding with the stoppers 35.

Eighth Embodiment

Figure 22:
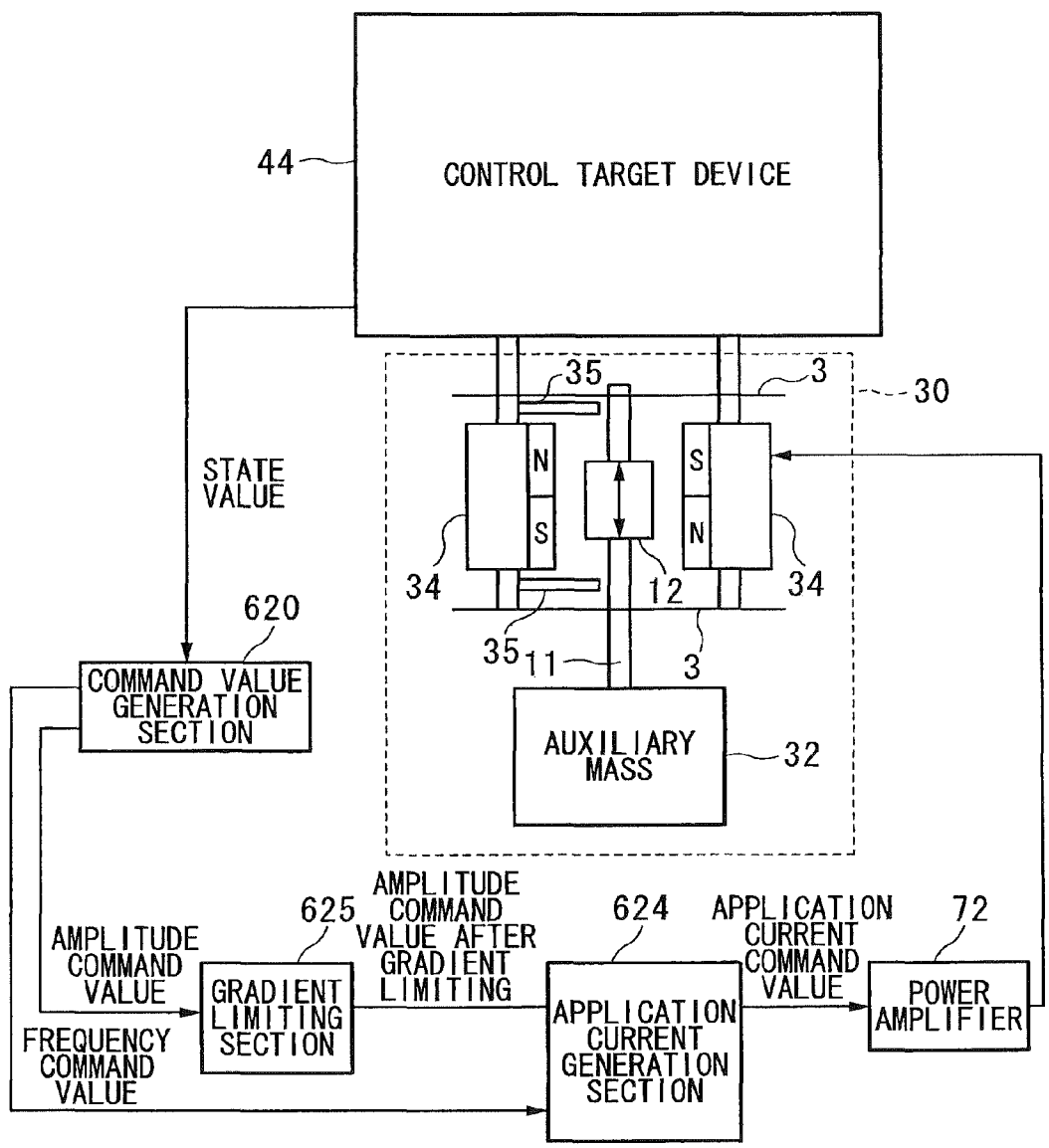
FIG. 22 is a block diagram showing a configuration of an eighth embodiment of the present invention.

Next, with reference to FIG. 22, a damping apparatus according to an eighth embodiment of the present invention is described. FIG. 22 is a block diagram showing a configuration of the same embodiment. In this diagram, the same reference symbols are given to components the same as those of the apparatus shown in FIG. 20, and descriptions thereof are omitted. This apparatus shown in FIG. 22 differs from the apparatus shown in FIG. 20 in that instead of the amplitude upper limit clamp table 621, there is provided a gradient limiting section 625, and an application current generation section 624 finds an application current command value based on the amplitude command value in which the gradient of amplitude changes is limited by the gradient limiting section 625. The gradient limiting section 625 is for turning the gradient of changes in an inputted amplitude command value into gradual changes to be output. In the case where the application current generation section 624 finds a new application current command value, based on an amplitude command value in which the gradient of changes is limited by the gradient limiting section 625 and a frequency command value output from the command value generation section 620, a new application current command value is found and output to the power amplifier 72, and thereby sudden changes in application current can be suppressed. As a result, it is possible to prevent the movable element 12 from colliding with the stoppers 35. Moreover, by providing limitation only in the case where frequency changes are significant, it is possible to reduce response delays.

Figure 23:
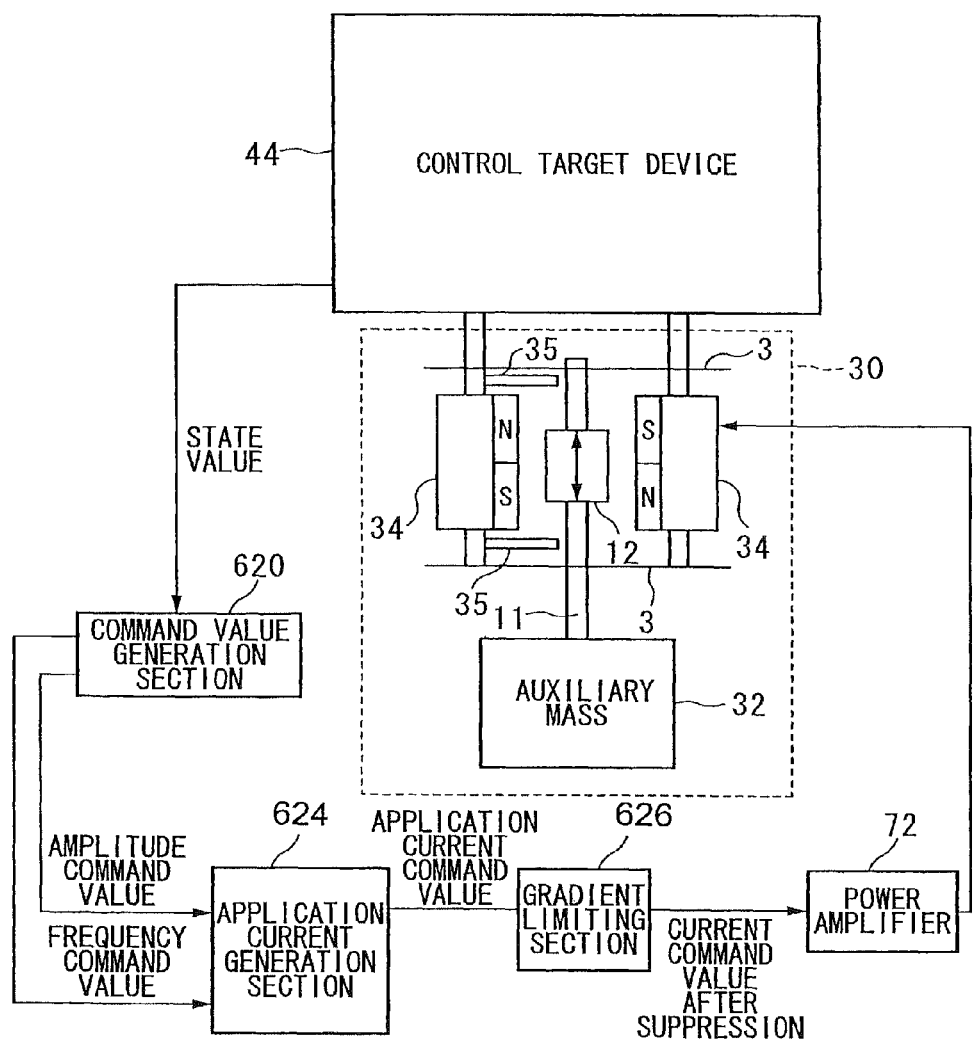
FIG. 23 is a block diagram showing a modified example of the configuration of the eighth embodiment shown in FIG. 22.

Next, a modified example of the damping apparatus shown in FIG. 22 is described, with reference to FIG. 23. In this diagram, the same reference symbols are given to components the same as those of the apparatus shown in FIG. 22, and descriptions thereof are omitted. The apparatus shown in this diagram differs from the apparatus shown in FIG. 22 in that the gradient limiting section 626 is provided on the subsequent stage of the application current generation section 624. The gradient limiting section 626 has a function equal to that of the low pass filter, and receives the input of the application current command value found by the application current generation section 624, and turns the gradient of changes in this inputted application current command value into gradual changes to be output. The gradient of changes in the application current command value newly found by the application current generation section 624 is corrected to be gradual and output to the power amplifier 72, and thereby sudden changes in application current can be suppressed. Therefore, it is possible to prevent the movable element 12 from colliding with the stoppers 35.

Ninth Embodiment

Figure 24:
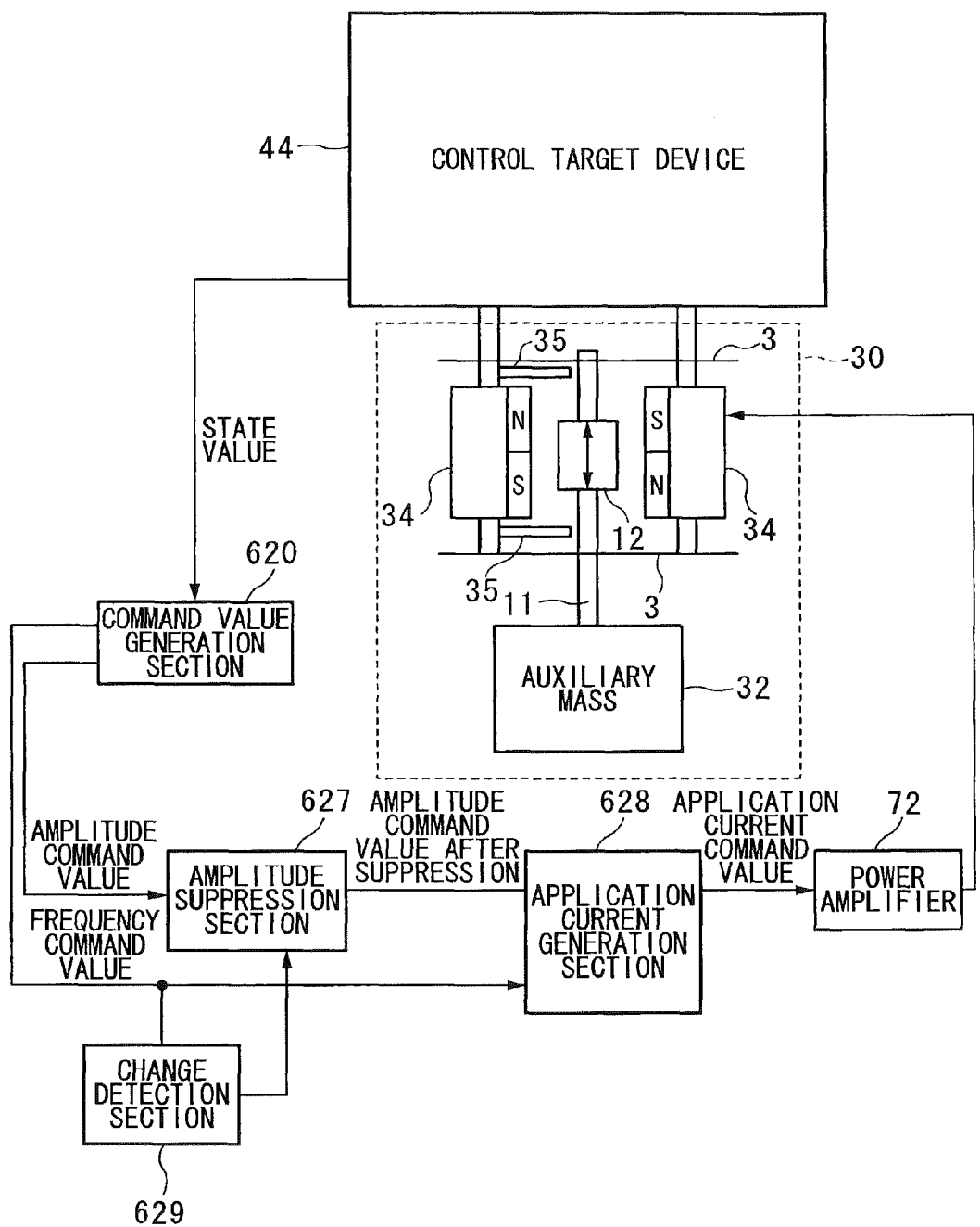
FIG. 24 is a block diagram showing a configuration of a ninth embodiment of the present invention.

Next, with reference to FIG. 24, a damping apparatus according to a ninth embodiment of the present invention is described. FIG. 24 is a block diagram showing a configuration of the same embodiment. In this diagram, the same reference symbols are given to components the same as those of the apparatus shown in FIG. 20, and descriptions thereof are omitted. This apparatus shown in FIG. 24 differs from the apparatus shown in FIG. 20 in that instead of the amplitude upper limit clamp table 621, there is provided an amplitude suppression section 627 and a change detection section 629, and an application current generation section 628 finds an application current command value based on the amplitude command value whose amplitude is limited by the amplitude suppression section 627. The amplitude suppression section 627 suppresses changes in amplitude command values, according to the change amount of the frequency command value detected by the change detection section 629. The change detection section 629 constantly detects changes in the frequency command value output from the command value generation section 620, and in the case where the change amount exceeds a predetermined value, notifies the amplitude suppression section 627 that the change amount has exceeded the predetermined value. In the case where the application current generation section 628 finds a new application current command value, then based on an amplitude command value whose amplitude is limited by the amplitude suppression section 627 based on the frequency changes detected by the change detection section 629, and a frequency command value output from the command value generation section 620, a new application current command value is found and output to the power amplifier 72, and thereby sudden changes in application current can be suppressed. As a result, it is possible to prevent the movable element 12 from colliding with the stoppers 35. Moreover, by appropriately controlling the amount of amplitude suppression with the amplitude suppression section 627, it is still possible to continue driving to a certain degree even when sudden frequency changes occur.

Figure 25:
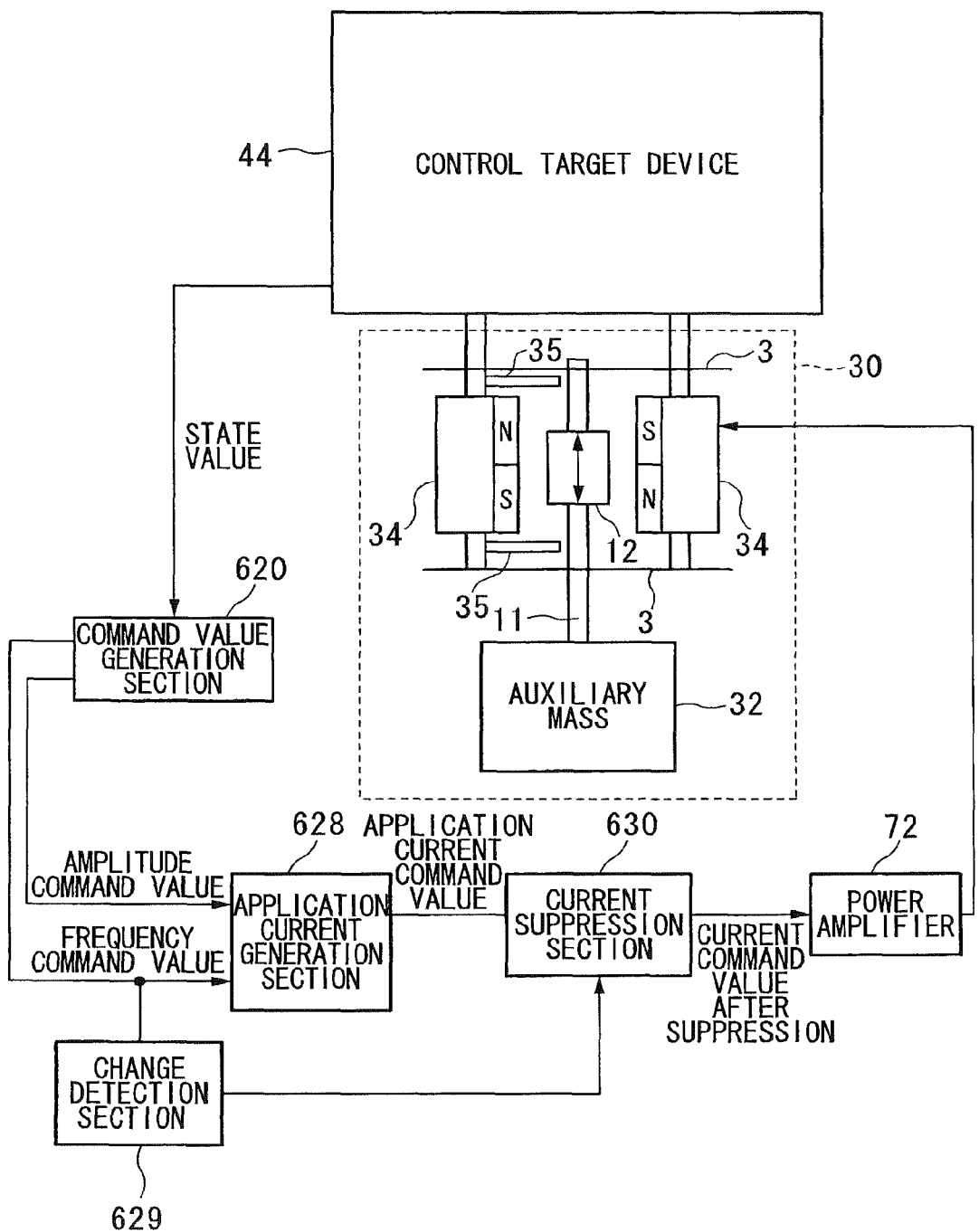
FIG. 25 is a block diagram showing a modified example of the configuration of the ninth embodiment shown in FIG. 24.

Next, a modified example of the damping apparatus shown in FIG. 24 is described, with reference to FIG. 25. In this diagram, the same reference symbols are given to components the same as those of the apparatus shown in FIG. 24, and descriptions thereof are omitted. The apparatus shown in this diagram differs from the apparatus shown in FIG. 24 in that instead of the amplitude suppression section 627, there is provided a current suppression section 630. The current suppression section 630 suppresses changes of the application current command value found by the application current generation section 628 in the case where the change amount of the frequency command value detected by the change detection section 629 has exceeded a predetermined value. In the case where the change amount of the frequency command value output from the command value generation section 620 has exceeded the predetermined value, an application current command value newly found by the application current generation section 628 is corrected so as to suppress changes, and is output to the power amplifier 72. Thereby, sudden changes in application current can be suppressed, and therefore it is possible to prevent the movable element 12 from colliding with the stoppers 35.

As described above, in the case of controlling current to be applied to the actuator (reciprocating motor) based on the amplitude command value and frequency command value of vibrations to be generated, the value of current to be applied to the actuator is limited so that the vibration amplitude of the auxiliary mass 32 does not exceed a predetermined value. Therefore, it is possible to constantly drive the movable element of the actuator within an appropriate movable range. Thus, collision between the movable element 12 and the stoppers 35 is eliminated, and therefore generation of collision sound can be suppressed. Furthermore, since control of the application current value enables constant driving of the movable element of the actuator within an appropriate movable range, the stoppers 35 provided within the actuator (reciprocating motor) are no longer required, and it is possible to simplify the structure of the actuator.

A program for realizing the respective functions may be recorded on a computer-readable recording medium, and the program recorded on this recording medium may be loaded and executed on a computer system to thereby perform vibration suppression control. The "computer system" here includes an OS (operation system) and hardware such as peripheral devices. Moreover, the "computer-readable recording medium" refers to a transportable medium such as flexible disc, magnetic optical disc, ROM, and CD-ROM, or a recording device such as built-in hard disk of a computer system. Furthermore, the "computer-readable recording medium" includes a medium that holds a program for a certain period of time, and examples of such recording medium include built-in volatile memory (RAM) of a computer system serving as a server or client in the case where the program is transmitted via a network such as the Internet or a communication line such as a telephone line.

Moreover, the above program may be transmitted from a computer system having this program stored in a storage device or the like, to another computer system via a transmission medium or transmission waves in the transmission medium. Here the "transmission medium" for transmitting the program refers to a medium having a function of transmitting information, such as networks such as the Internet (communication networks) or communication circuits such as telephone lines (communication lines). Also, the above program may be a program for realizing part of the function described above. Furthermore, the above program may be a so-called differential file (differential program) that can be realized by combining the above described functions with the program pre-recorded on the computer system.

INDUSTRIAL APPLICABILITY

In the above description, the description has been for where the damping target is an automobile body. However, the damping target device of the present invention does not always have to be an automobile body, and it may be an autonomous traveling carrier, a robot arm, and so forth.

The invention claimed is:

1. A damping apparatus that comprises an actuator that drives an auxiliary mass held by spring elements, with respect to a damping target section, and that suppresses vibrations of the damping target section by using a reaction force at the time of driving the auxiliary mass, the damping apparatus further comprising a resonance suppression section of the actuator based on an ideal actuator inverse characteristic that uses a transfer function of a vibration velocity with respect to an excitation force of a vibrating system of the actuator.

2. The damping apparatus according to claim 1, wherein the transfer function is a secondary vibrating system transfer function of relative vibration velocity with respect to excitation force.

3. The damping apparatus according to claim 2, wherein a damping coefficient of the transfer function is within a range of $\frac{1}{100}$ to 100 times a critical damping.

4. The damping apparatus according to claim 1 further comprising a band-pass filter that limits the ideal actuator inverse characteristic to a band in a vicinity of a resonance frequency of the actuator.

5. The damping apparatus according to claim 1, wherein the vibration velocity is calculated from a current and an applied voltage of the actuator.

6. The damping apparatus according to claim 1, wherein the vibration velocity is calculated from a current signal flowing through the actuator, and a voltage command value to the actuator.

7. The damping apparatus according to claim 1 further comprising a vibration suppression command generating section that generates a vibration suppression command value for suppressing vibrations of the damping target section.

8. The damping apparatus according to claim 7, wherein the vibration suppression command value is generated based on an excitation force of an excitation source or frequency information of an excitation force.

9. The damping apparatus according to claim 7, wherein the vibration suppression command value is generated based on an excitation force of an excitation source or frequency information of an excitation force, and a vibration signal of a vibration observation point.

10. The damping apparatus according to claim 7, wherein the vibration suppression command value is generated from vibration information of the damping target section.

11. The damping apparatus according to claim 7, wherein the vibration suppression command value is generated from vibration information of the damping target section, and a vibration signal of a vibration observation point.

12. The damping apparatus according to claim 7, wherein the vibration suppression command value is generated from excitation force information of the damping target section.

13. The damping apparatus according to claim 7, wherein the vibration suppression command value is generated from excitation force information of the damping target section, and a vibration signal of a vibration observation point.

14. The damping apparatus according to claim 1, wherein the actuator is an electromagnetic linear actuator that generates a thrust by an electromagnetic force.

15. The damping apparatus according to claim 14, wherein the electromagnetic linear actuator is a reciprocating motor.

16. The damping apparatus according to claim 1, wherein the actuator is a piezoelectric linear actuator that uses an element that causes displacement by applying a voltage thereto.

17. A damping method for a damping apparatus that comprises an actuator that drives an auxiliary mass held by spring elements, with respect to a damping target section, and that suppresses vibrations of the damping target section by using a reaction force at the time of driving the auxiliary mass, the damping method comprises a resonance suppression step of the actuator based on an ideal actuator inverse characteristic that uses a transfer function of a vibration velocity with respect to an excitation force of a vibrating system of the actuator.

* * * * *